United States Patent
Miyamoto et al.

(10) Patent No.: US 11,402,566 B2
(45) Date of Patent: Aug. 2, 2022

(54) SIDE-EDGE TYPE SURFACE LIGHT EMITTING APPARATUS HAVING MULTIPLE GRADUALLY-SLOPED PEAK-SHAPED PRISMS

(71) Applicant: STANLEY ELECTRIC CO., LTD., Tokyo (JP)

(72) Inventors: Takashi Miyamoto, Tokyo (JP); Atsushi Takeuchi, Tokyo (JP); Nobuyuki Shigeno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/212,699

(22) Filed: Mar. 25, 2021

(65) Prior Publication Data
US 2021/0325596 A1  Oct. 21, 2021

(30) Foreign Application Priority Data
Apr. 16, 2020  (JP) .............................. JP2020-073402

(51) Int. Cl.
*F21V 8/00* (2006.01)
*G02F 1/1335* (2006.01)

(52) U.S. Cl.
CPC ......... *G02B 6/0053* (2013.01); *G02B 6/0073* (2013.01); *G02F 1/133524* (2013.01)

(58) Field of Classification Search
CPC .................................................. G02B 6/0053
USPC .......................... 362/600, 606–608, 615–622
See application file for complete search history.

(56) References Cited

U.S. PATENT DOCUMENTS

| 9,366,798 | B2 | 6/2016 | Chijiwa | |
| 2004/0085749 | A1* | 5/2004 | Parker | G02F 1/133615 362/601 |
| 2009/0086509 | A1* | 4/2009 | Omori | G02B 6/0061 362/628 |
| 2015/0009711 | A1 | 1/2015 | Chijiwa | |
| 2017/0205558 | A1* | 7/2017 | Hirayama | G02B 6/0055 |

FOREIGN PATENT DOCUMENTS

| JP | 2015-15083 A | 1/2015 |
| KR | 20130109429 A | * 10/2013 |

* cited by examiner

*Primary Examiner* — Keith G. Delahoussaye
(74) *Attorney, Agent, or Firm* — Kenealy Vaidya LLP

(57) ABSTRACT

In a side-edge type surface light emitting apparatus including a light guide plate having a light emitting surface and a light distribution controlling surface opposing each other, and a light incident surface and a counter light incident surface opposing each other on sides of the light emitting surface and the light distribution controlling surface; a light source disposed on the light incident surface; and a prism sheet having multiple peak-shaped prisms protruded toward the light emitting surface and in parallel with the light incident surface, each of the peak-shaped prisms has a definite apical shape and a definite apical height, and the peak-shaped prisms have a definite pitch. The peak-shaped prisms have sloped angles gradually changed from the light incident surface to the counter light incident surface.

12 Claims, 31 Drawing Sheets

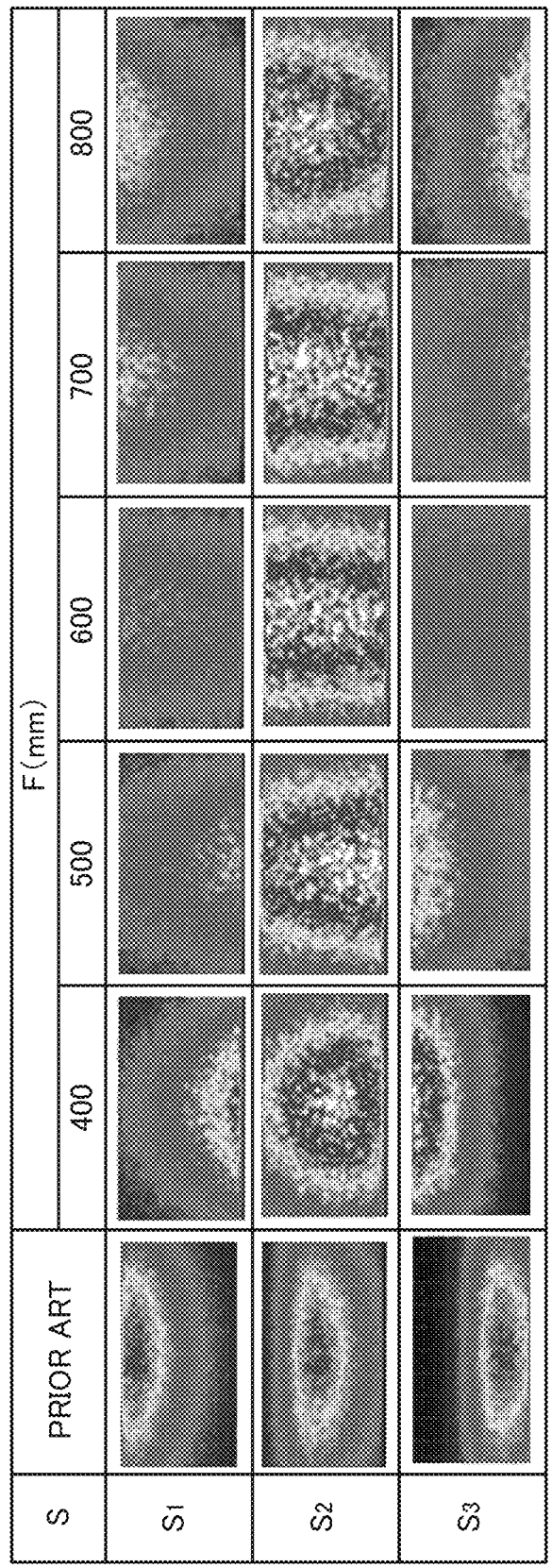

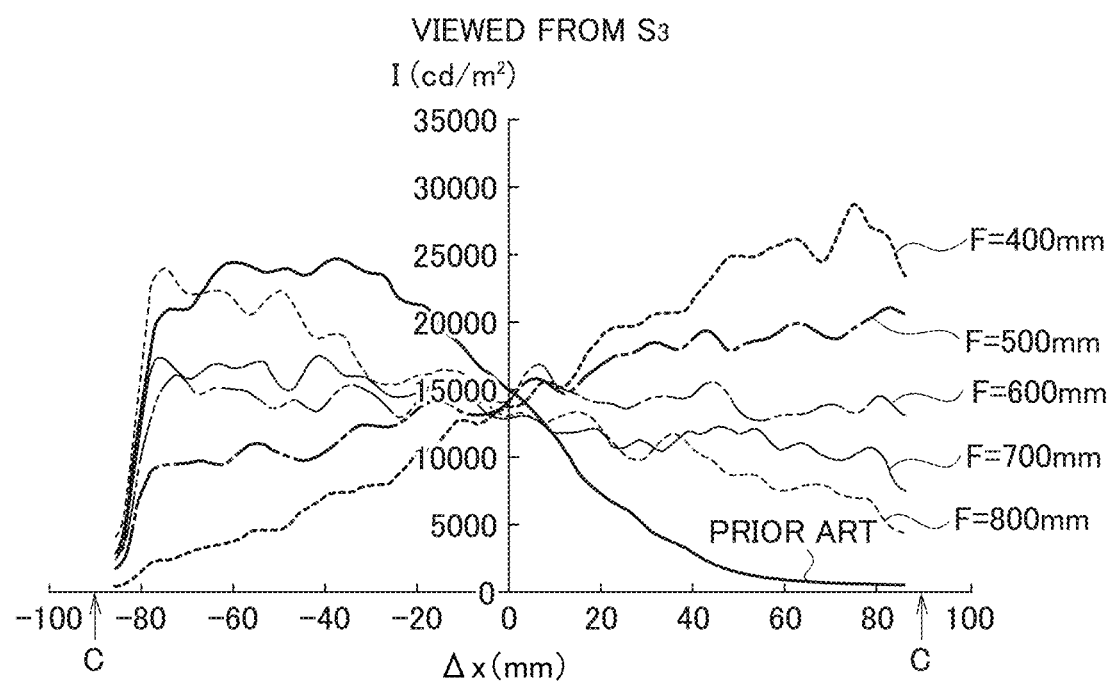

Fig.7 d=600mm (BROAD DISTRIBUTION)

| S | PRIOR ART | F (mm) | | | | | |
|---|---|---|---|---|---|---|---|
| | | 400 | 500 | 600 | 700 | 800 |
| S1 | | | | | | |
| S2 | | | | | | |
| S3 | | | | | | |

Fig.9 d=500mm (NARROW DISTRIBUTION)

| S | PRIOR ART | F(mm) | | | | | |
|---|---|---|---|---|---|---|---|
| | | 400 | 500 | 600 | 700 | 800 |
| $S_1$ | | | | | | |
| $S_2$ | | | | | | |
| $S_3$ | | | | | | |

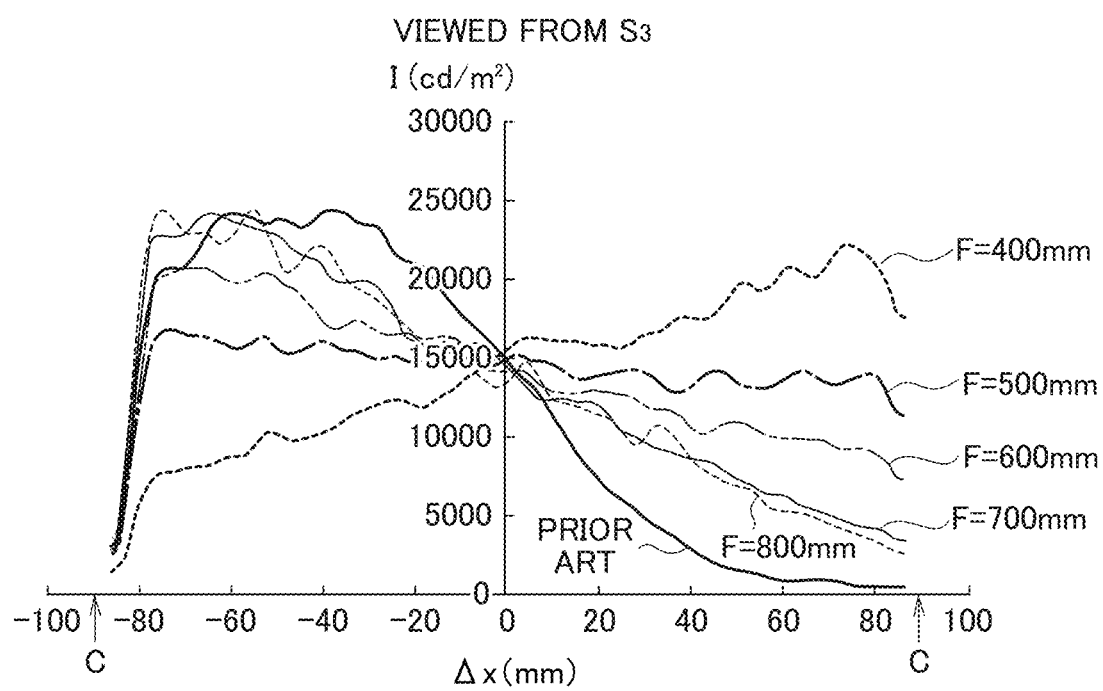

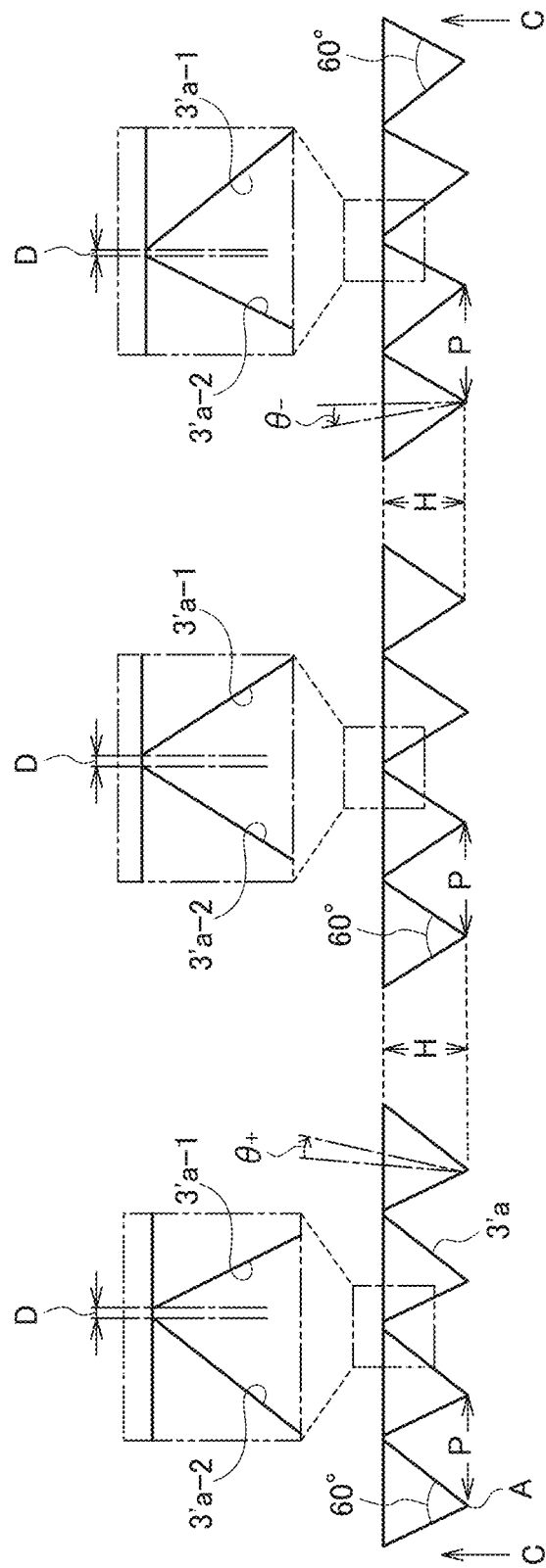

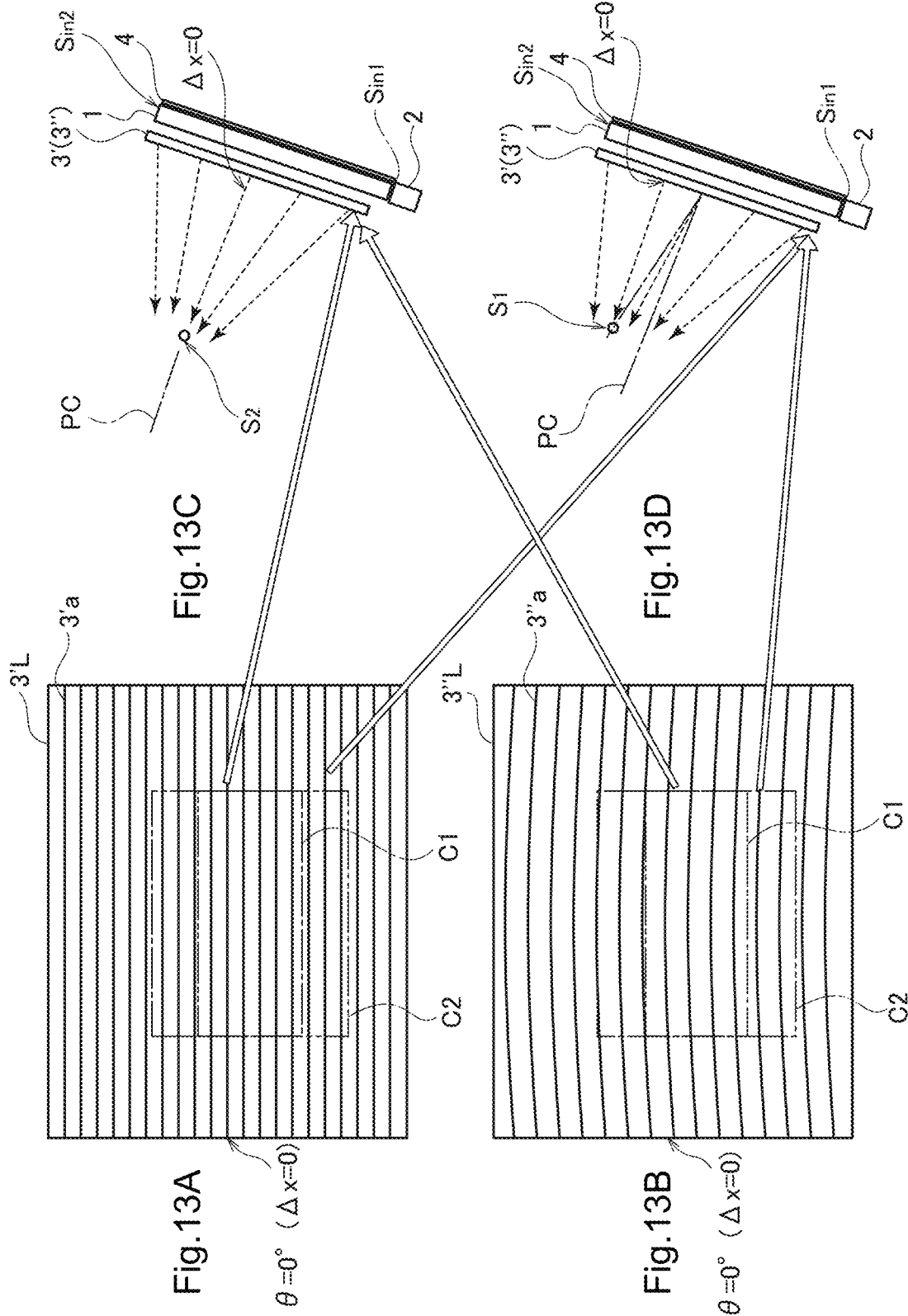

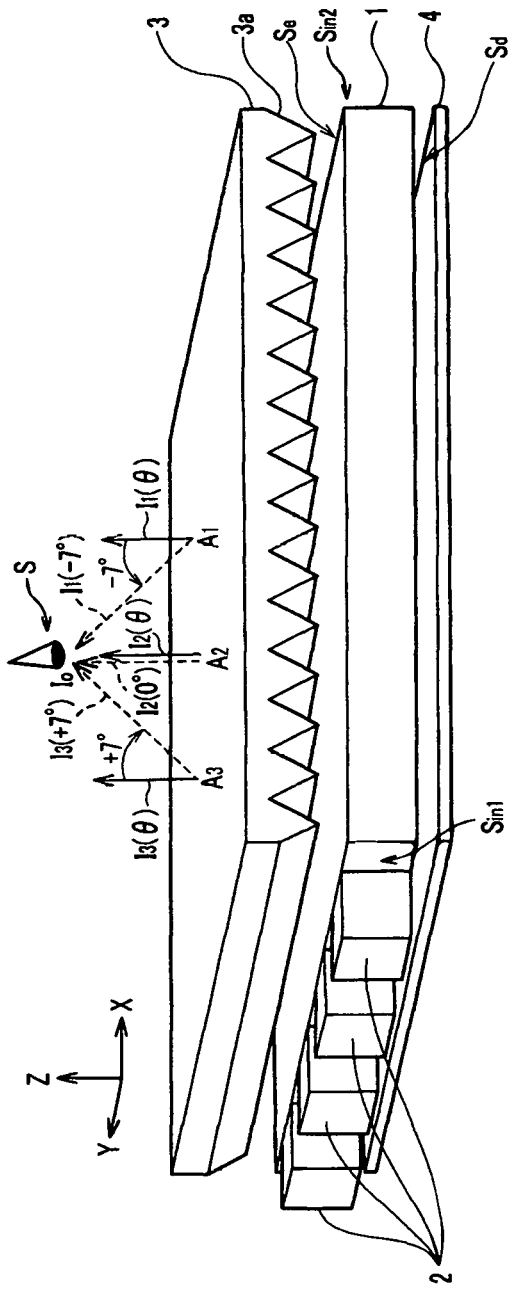

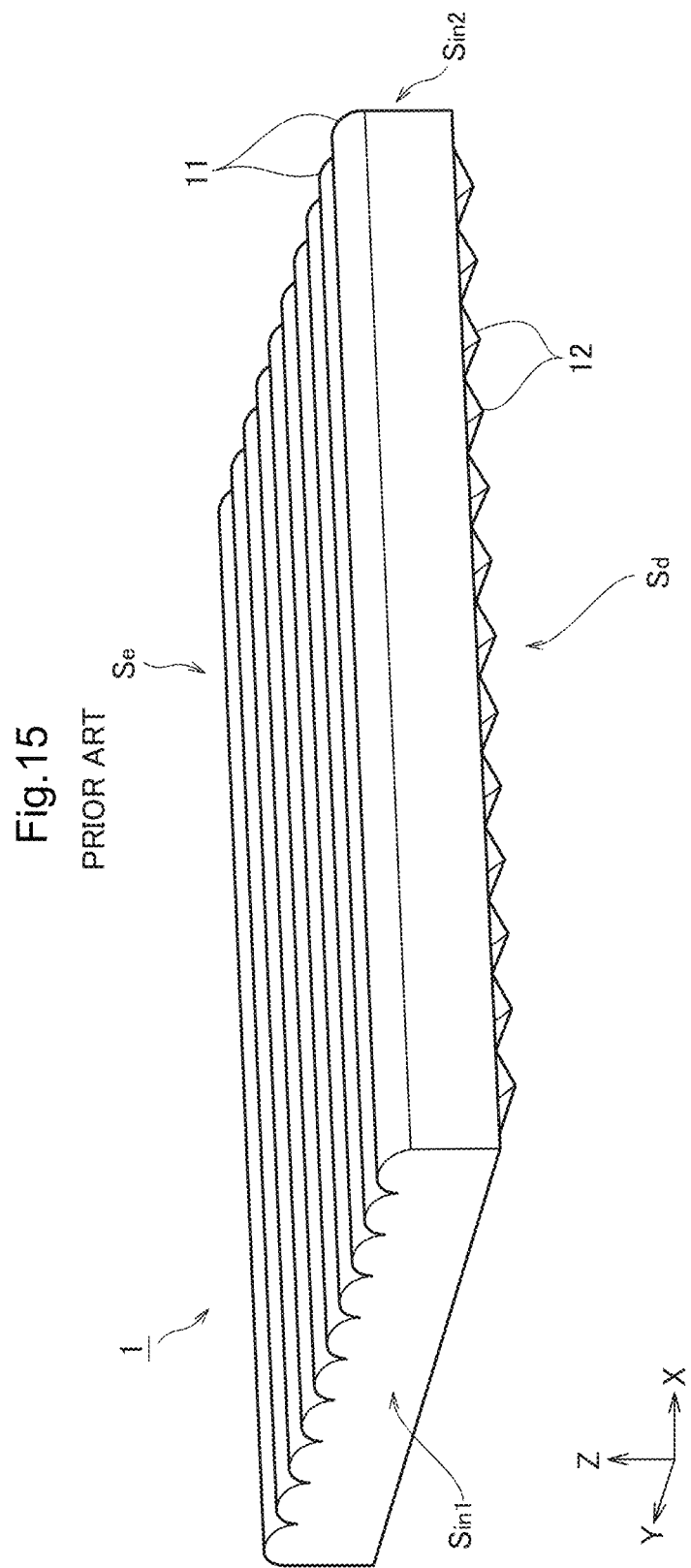

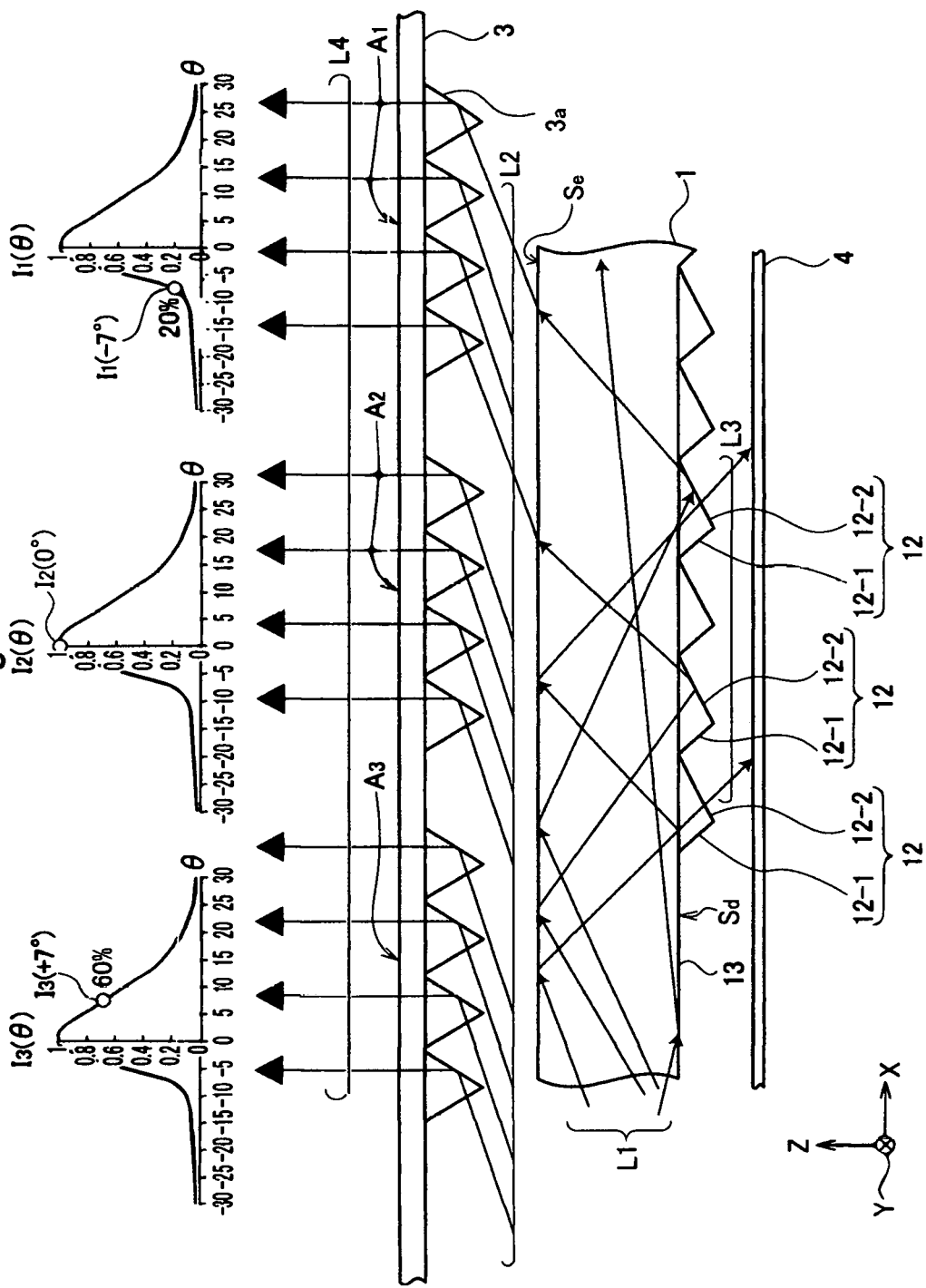

SIDE-EDGE TYPE SURFACE LIGHT EMITTING APPARATUS HAVING MULTIPLE GRADUALLY-SLOPED PEAK-SHAPED PRISMS

This application claims the priority benefit under 35 U.S.C. § 119 to Japanese Patent Application No. JP2020-073402 filed on Apr. 16, 2020, which disclosure is hereby incorporated in its entirety by reference.

BACKGROUND

Field

The presently disclosed subject matter relates to a side-edge type surface light emitting apparatus, and more particularly, to the improvement of a prism sheet.

Description of the Related Art

A side-edge type surface light emitting apparatus, which is constructed by a light guide plate with multiple light emitting elements such as light emitting diode (LED) elements disposed on the side thereof, has broadly been used as a backlight for a display unit such as a liquid crystal display (LCD) unit in terms of its thin and light structure. When the display unit is used in a public place, a narrow light distribution characteristic or a narrow-viewing characteristic is required to prevent others from viewing the display unit from the side. This is called the privacy effect.

FIG. 14 is a perspective view illustrating a prior art side-edge type surface light emitting apparatus (see: JP2015-15083A (JP6184205B2) & US2015/0009711A1 (US9, 366, 798B2)).

In FIG. 14, a side-edge type surface light emitting apparatus is constructed by a double-face prism light guide plate 1 having a light emitting surface $S_e$, a light distribution controlling surface $S_d$ opposing the light emitting surface $S_e$, a light incident surface $S_{in1}$ and a counter light incident surface $S_{in2}$ on the sides of the light emitting surface $S_e$ and the light distribution controlling surface $S_d$, multiple LED elements 2 disposed on the light incident surface $S_{in1}$, a single-face prism sheet 3 disposed on the light emitting surface $S_e$, and a light reflecting sheet 4 disposed on the side of the light distribution controlling surface $S_d$. Note that an LCD panel (not shown) is provided on the outer surface of the prism sheet 3. In this case, the light incident surface $S_{in1}$ is located on the down side, while the counter light incident surface $S_{in2}$ is located on the up side.

The single-face prism sheet 3 includes multiple triangular-shaped prisms 3a along the Y-direction, each of the prisms 3a having the same triangular-shaped configuration protruded downward viewed from the side.

In the side-edge type surface light emitting apparatus of FIG. 14, when light is introduced from the LED elements 2 into the light incident surface $S_{in1}$ of the light guide plate 1, a part of the light is emitted from the light emitting surface $S_e$ through the single-face prism sheet 3 to the outside. As a result, the luminous intensity $I_0$ at a viewpoint S corresponding to the viewer's eyes apart from the single-face prism sheet 3 can be determined by $I_1$ (−7°) $I_2$(0°), and $I_3$(+7°) and so on, wherein:

$I_1$ (−7°) is a luminous intensity of light propagated at the azimuth angle θ=−7° to the viewpoint S from an upper-side light emitting area $A_1$ of the prism sheet 3 on the side of the counter light incident surface $S_{in2}$ in which the upper-side light emitting area $A_1$ has a luminous intensity distribution $I_1$ (θ) symmetrical with respect to θ=0° (see FIG. 17);

$I_2$(0°) is a luminous intensity of light propagated at the azimuth angle θ=0° to the viewpoint S from a center-side light emitting area $A_2$ of the prism sheet 3 immediately below the viewpoint S in which the center-side light emitting area $A_2$ has a luminous intensity distribution $I_2$ (θ) symmetrical with respect to θ=0° (see FIG. 17); and $I_3$ (+7°) is a luminous intensity of light propagated at the azimuth angle θ=+7° to the viewpoint S from a lower-side light emitting area $A_3$ of the prism sheet 3 on the side of the light incident surface $S_{in1}$ in which lower-side light emitting area $A_3$ has a luminous intensity distribution $I_3$ (θ) symmetrical with respect to θ=0° (see FIG. 17). In this case, $I_1$ (θ)≈$I_2$ (θ)≈$I_3$ (θ).

On the other hand, a remainder of the light may leak from the light distribution controlling surface $S_d$ to the light reflecting sheet 4. In this case, the light reflecting sheet 4 returns the remainder of the light to the light guide plate 1. Note that the light reflecting sheet 4 can be replaced by a light absorbing sheet.

The light waveguide plate 1 of FIG. 14 will be explained next with reference to FIGS. 15, 16A and 16B.

In FIG. 15, which is a perspective view of the light waveguide plate 1 of FIG. 14, the light waveguide plate 1 is made of a transparent material such as acryl resin or polycarbonate resin. The light guide plate 1 is of a double prism type which has multiple upper-side prisms 11 along the X-direction (light propagation direction) perpendicular to the light incident surface $S_{in1}$ on the light emitting surface $S_e$ and multiple lower-side prisms 12 along the Y-direction in parallel with the light incident surface $S_{in}$ on the light distribution controlling surface $S_d$. When light from the LED elements 2 (see: FIG. 14) is incident to the light incident surface $S_{in1}$, the light propagates through the interior of the light guide plate 1, so that the light is reflected by the prisms 12 toward the prisms 11 to emit the light from the light emitting surface $S_e$.

The prisms 11 protrude along the positive side of the Z-direction, i.e., they are convex, and are arranged in parallel with the X-direction (propagation direction). In more detail, each of the prisms 11 has a cross section of an isosceles triangular shape or a semi-circular shape.

In FIG. 16A, which is a bottom view of the lower-side prisms 12 of FIG. 15, and in FIG. 16B, which is a partial cross-sectional view of FIG. 16A, multiple flat mirror finished surfaces 13 are provided on the light distribution controlling surface $S_d$ along the X-direction, in order to spread light to the inner part of the light guide plate 1. The farther from the light incident surface $S_{in1}$ the flat mirror finished surfaces 13 are located, the smaller the width of the flat mirror finished surfaces 13 along the Y-direction at that location. The sequences of the prisms 12, each including a sloped surface 12-1 with a large angle α1 and a sloped surface 12-2 with a small angle α2 (<α1), are provided between the flat mirror finished surfaces 13. The farther from the light incident surface $S_{in1}$ the prisms 12 are located, the larger the width of sequences of the prisms 12 along the Y-direction at that location.

In FIG. 17, which is a cross-sectional view for explaining the operation of the light guide plate 1 and the prism sheet 3 of FIG. 14, some light is totally reflected between the light emitting surface $S_e$ and the light distribution controlling surface $S_d$, and then is refracted at the light emitting surface $S_e$ or the sloped surface 12-2 of one of the prisms 12. In this case, since the width of the flat mirror finished surfaces 13 and the width of the prisms 12 along the Y-direction are changed along the X-direction, the luminous intensity distribution I(θ) of light L2 within the light emitting surface $S_e$ of the light guide plate 1 can be uniform as shown in FIG. 18A where ND indicates a narrow distribution and BD indicates a broad distribution. Thus, the light L2 emitted from the light emitting surface $S_e$ is neither disturbed nor diffused, but is refracted at a definite angle with respect to the normal line of the light emitting surface $S_e$. Further, the light L2 of the light emitting surface $S_e$ is converted by the triangular-shaped prisms 3a of the single-face prism sheet 3 into collimated light L4. The collimated light L4 whose focal length F is infinite has a luminous intensity distribution as shown in FIG. 18B where ND' indicates a narrow distribution and BD' indicates a broad distribution. The narrow distribution ND' rather than the broad distribution BD' could exhibit a narrow-viewing characteristic.

On the other hand, some of the light L1 is leaked from the light distribution controlling surface $S_d$ of the light guide plate 1 to the light reflecting sheet 4.

In FIG. 17, assume that the viewpoint $S_2$ (not shown) is located above a center of the prism sheet 3 (see: FIG. 20A), and each of the luminous intensity distributions $I_1$ (θ), $I_2$ (θ) and $I_3$ (θ) for the light emitting areas $A_1$, $A_2$ and $A_3$, respectively, of the prism sheet 3 are given by the broad distribution BD' of FIG. 18B. In this case, the luminous intensity distributions $I_1$ (θ), $I_2$ (θ) and $I_3$ (θ) are approximately the same as each other: $I_1$ (θ)≈$I_2$ (θ)≈$I_3$ (θ). The luminous intensity $I_1$ (−7°) of light propagated from the upper-side light emitting area $A_1$ to the center-side located viewpoint $S_2$ is 20% of the luminous intensity $I_2$ (0°) of light propagated from the center-side light emitting area $A_2$ to the center-side located viewpoint $S_2$, and the luminous intensity $I_3$ (+7°) of light propagated from the lower-side light emitting area $A_3$ to the center-side located viewpoint $S_2$ is 60% of the luminous intensity $I_2$ (0°) of light propagated from the -center-side light emitting area $A_2$ to the center-side located viewpoint $S_2$. This will be now explained below.

FIG. 19A is a view for explaining the upper-side located viewpoint $S_1$ of the side-edge type surface light emitting apparatus of FIG. 14, FIG. 19B is a luminous intensity distribution on the outer surface of the prism sheet 3 viewed from the upper-side located viewpoint $S_1$ of FIG. 19A, and FIG. 19C is a graph of the luminous intensity distribution taken along the line C-C of FIG. 19B.

As illustrated in FIG. 19A, an upper-side located viewpoint $S_1$ is located at a degree of +5° with respect to a normal at the center of the prism sheet 3. In this case, the luminous intensity distribution viewed from the upper-side located viewpoint $S_1$ is strongly subjected to the luminous intensity $I_1$ (0°) of light propagated from the upper-side light emitting area $A_1$ of the prism sheet 3 to the upper-side located viewpoint $S_1$. In this case, the upper-side light emitting area $A_1$ has a luminous intensity distribution $I_1(θ)$ symmetrical with respect to θ=0°. On the other hand, the luminous intensity $I_2$ (+5°) of light propagated from the center-side light emitting area $A_2$ of the prism sheet 3 to the upper-side located viewpoint $S_1$ is smaller than $I_1$ (0°), and the luminous intensity $I_3$ (+10°) of light propagated from the lower-side light emitting area $A_3$ of the prism sheet 3 to the upper-side located viewpoint $S_1$ is much smaller than $I_1$ (0°). In this case, the center-side light emitting area $A_2$ and the lower-side light emitting area $A_3$ have luminous intensity distributions $I_2$ (θ) and $I_3$ (θ), respectively, which are approximately the same as $I_1$ (θ). That is, $I_1$ (θ)≈$I_2$ (θ)≈$I_3$ (θ). As a result, as illustrated in FIG. 19B, a bright area (bright line) BA is formed on the outer surface of the prism sheet 3 on the side of the counter light incident surface $S_{in2}$, while a dark area (dark band) DA is formed on the lower-side of the prism sheet 3 on the side of the light incident surface $S_{in1}$. Therefore, as illustrated in FIG. 19C, the average luminous intensity $I_{av}$ is about 13000 cd/m$^2$, and the difference Δ I in luminous intensity taken along the line C-C of FIG. 19B is very large. Note that in FIGS. 19B and 19C, Δ x is the deviation from the center between the light incident surface $S_{in1}$ and the counter light incident surface $S_{in2}$.

FIG. 20A is a view for explaining the center-side located viewpoint $S_2$ of the side-edge type surface light emitting apparatus of FIG. 14, FIG. 20B is a luminous intensity distribution on the outer surface of the prism sheet 3 viewed from the center-side located viewpoint $S_2$ of FIG. 20A, and FIG. 20C is a graph of the luminous intensity distribution taken along the line C-C of FIG. 20B.

As illustrated in FIG. 20A, a center-side located viewpoint $S_2$ is located at a normal at the center of the prism sheet 3. In this case, the luminous intensity distribution viewed from the center-side located viewpoint $S_2$ is strongly subjected to the luminous intensity $I_2$ (0°) of light propagated from the center-side light emitting area $A_2$ of the prism sheet 3 to the center-side located viewpoint $S_2$. On the other hand, the luminous intensity $I_1$ (−7°) of light propagated from the upper-side light emitting area $A_1$ of the prism sheet 3 to the center-side located viewpoint $S_2$ is smaller than $I_2$ (0°), and the luminous intensity $I_3$ (+7°) of light propagated from the lower-side light emitting area $A_3$ of the prism sheet 3 to the center-side located viewpoint $S_2$ is smaller than $I_2$ (0°). As a result, as illustrated in FIG. 20B, a bright area (bright line) BA is formed on the outer surface of the prism sheet 3 on the middle side thereof, while dark areas (dark band) DA are formed on the upper-side and the lower-side of the prism sheet 3. As a result, as illustrated in FIG. 20C, the average luminous intensity $I_{av}$ is about 13000 cd/m$^2$, and the difference Δ I or Δ I' in luminous intensity taken along the line C-C of FIG. 20B is very large.

FIG. 21A is a view for explaining the lower-side located viewpoint $S_3$ of the side-edge type surface light emitting apparatus of FIG. 14, FIG. 21B is a luminous intensity distribution on the outer surface of the prism sheet 3 viewed from the lower-side located viewpoint $S_3$ of FIG. 21A, and FIG. 21C is a graph of the luminous intensity distribution taken along the line C-C of FIG. 21B.

As illustrated in FIG. 21A, a lower-side located viewpoint $S_3$ is located at a degree of −5° with respect to a normal at the center of the prism sheet 3. In this case, the luminous intensity distribution viewed from the lower-side located viewpoint $S_3$ is strongly subjected to the luminous intensity $I_3$ (0°) of light propagated from the lower-side light emitting area $A_3$ of the prism sheet 3 to the lower-side located viewpoint $S_3$. On the other hand, the luminous intensity $I_1$ (−5°) of light propagated from the center-side light emitting area $A_2$ of the prism sheet 3 to the lower-side located viewpoint $S_3$ is smaller than $I_3$ (0°), and the luminous intensity $I_1$ (−10°) of light propagated from the upper-side light emitting area $A_1$ of the prism sheet 3 to the lower-side located viewpoint $S_3$ is much smaller than $I_3$ (0°). As a result, as illustrated in FIG. 21B, a bright area (bright line) BA is formed on the lower-side surface of the prism sheet 3 on the side of the light incident surface Sini, while a dark area (dark band) DA is formed on the upper-side of the prism sheet 3 on the side of the counter light incident surface $S_{in2}$. As a result, as illustrated in FIG. 21C, the average luminous intensity $I_{av}$ is about 13000 cd/m$^2$, and the difference Δ I in luminous intensity taken along the line C-C of FIG. 21B is very large.

In the side-edge type surface light emitting apparatus of FIG. 14, although the average luminous intensities viewed from the viewpoints $S_1$, $S_2$ and $S_3$ are the same such as 13000 cd/m$^2$, the luminous intensity distributions viewed from any of the viewpoints $S_1$, $S_2$ and $S_3$ along the vertical direction (C-C) have a large difference Δ I (Δ I'), i.e., a non-uniformity. Also, when the viewpoint (the viewer's eyes) is moved from the upper side to the lower side or vice versa with respect to the prism sheet 3, the bright area (bright line) BA would move from the upper side to the lower side or vice versa with respect to the prism sheet 3, so that the dark area (dark band) DA would be emphasized against the viewer.

SUMMARY

The presently disclosed subject matter seeks to solve one or more of the above-described problems.

According to the presently disclosed subject matter, in a side-edge type surface light emitting apparatus including a light guide plate having a light emitting surface and a light distribution controlling surface opposing each other, and a light incident surface and a counter light incident surface opposing each other on sides of the light emitting surface and the light distribution controlling surface; a light source disposed on the light incident surface; and a prism sheet having multiple peak-shaped prisms protruded toward the light emitting surface and in parallel with the light incident surface, each of the peak-shaped prisms has a definite apical shape and a definite apical height, and the peak-shaped prisms have a definite pitch. The peak-shaped prisms have sloped angles gradually changed from the light incident surface to the counter light incident surface.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 5 depicts photos of the luminous intensity distributions of the side-edge type surface light emitting apparatus of FIG. 1 where the distance d between the viewpoint and the prism sheet is 600 mm and the focal length of the prism sheet is changed and the emitting light of the light guide plate has a narrow distribution of FIG. 18A whose full width at half maximum is 30° to 15°;

FIG. 6C is a luminous intensity distribution of the vertical direction C-C of the prism sheet of FIG. 4A viewed from the lower-side located viewpoint in FIG. 5;

FIG. 7 depicts photos of the luminous intensity distributions of the side-edge type surface light emitting apparatus of FIG. 1 where the distance d between the viewpoint and the prism sheet is 600 mm and the focal length of the prism sheet is changed and the emitting light of the light guide plate has a broad distribution of FIG. 18A whose full width at half maximum is larger than 30° to 15°;

FIG. 9 depicts photos of the luminous intensity distributions of the side-edge type surface light emitting apparatus of FIG. 1 where the distance d between the viewpoint and the prism sheet is 500 mm and the focal length of the prism sheet is changed and the emitting light L2 of the light guide plate 1 has a narrow distribution of FIG. 18A whose full width at half maximum is 30° to 15°;

FIG. 10C is a luminous intensity distribution of the vertical direction C-C of the prism sheet of FIG. 4A viewed from the -lower-side located viewpoint in FIG. 9;

FIG. 11 is an enlarged cross-sectional view of the triangular prism of FIG. 2;

Figure 12A:
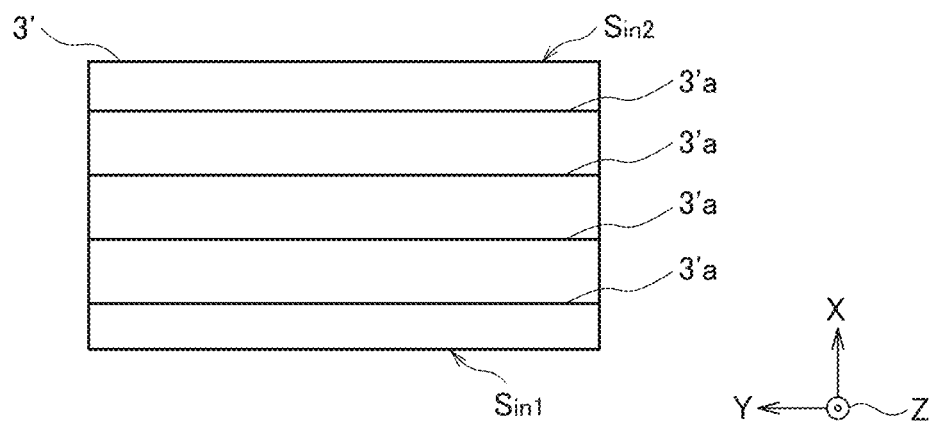
FIG. 12A is a cross-sectional view for explaining a modification of the triangular prism of FIG. 11.
Figure 12B:
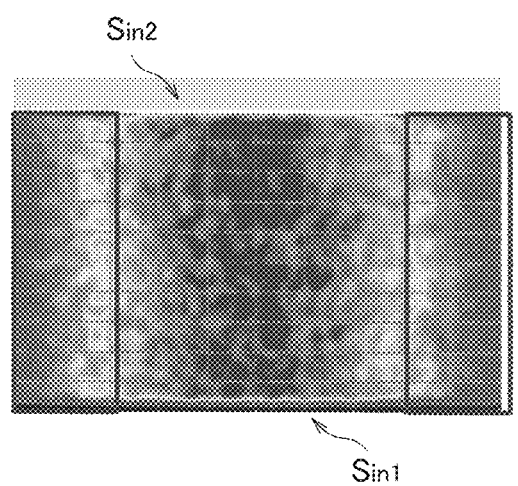
FIG. 12B is a cross-sectional photographic view for explaining a modification of the triangular prism of FIG. 11 where luminous intensity of the prism sheet B' viewed from the center-side located viewpoint is uniform along the X-direction but non-uniform along the Y-direction.
Figure 12C:
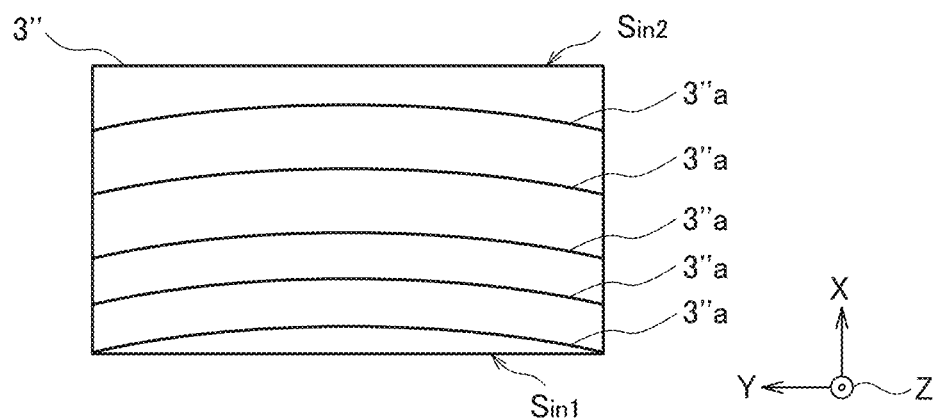
FIG. 12C is a cross-sectional view for explaining a modification of the triangular prism of FIG. 11.
Figure 16A:
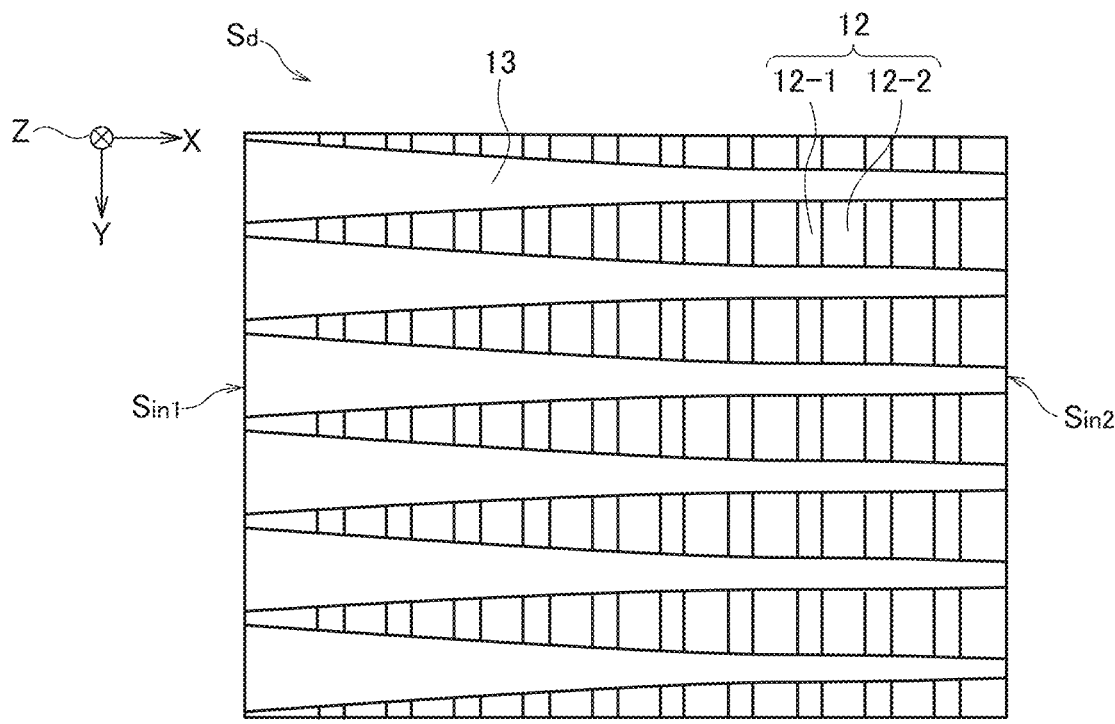
Figure 16B:
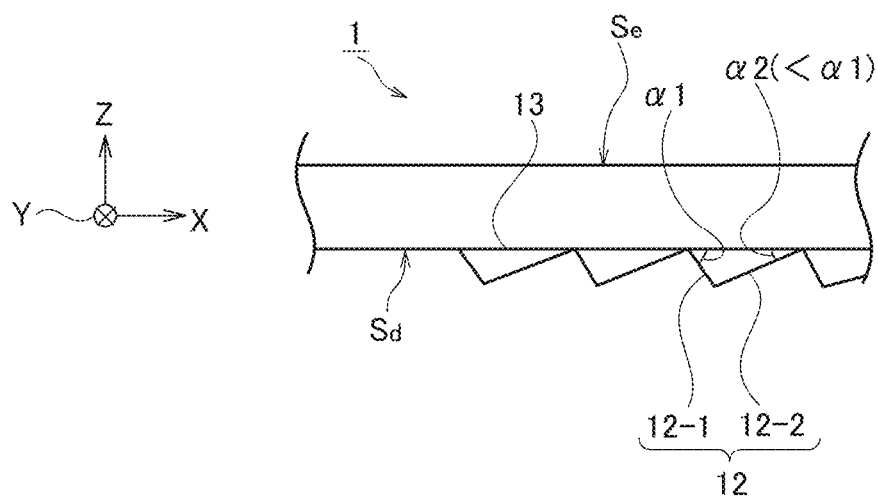
Figure 18A:
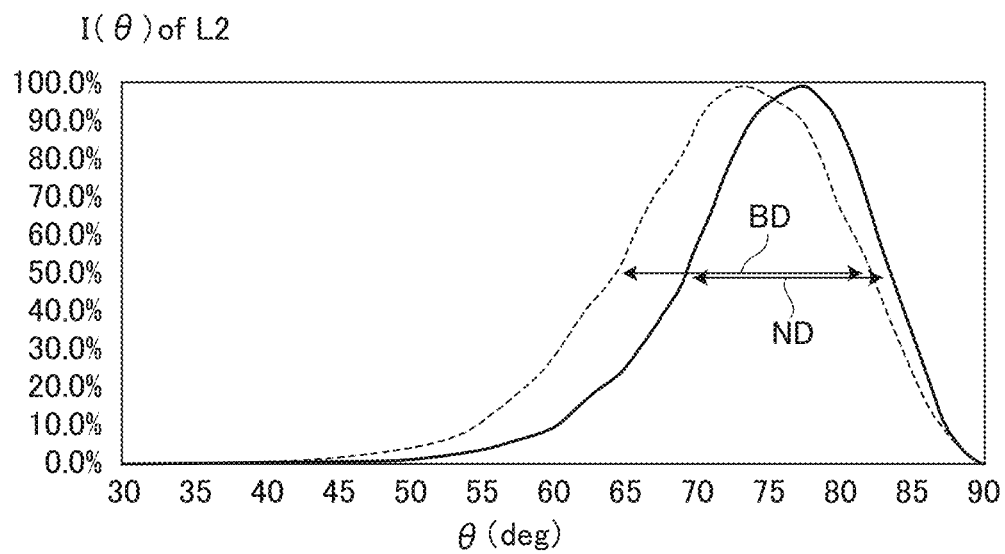
Figure 18B:
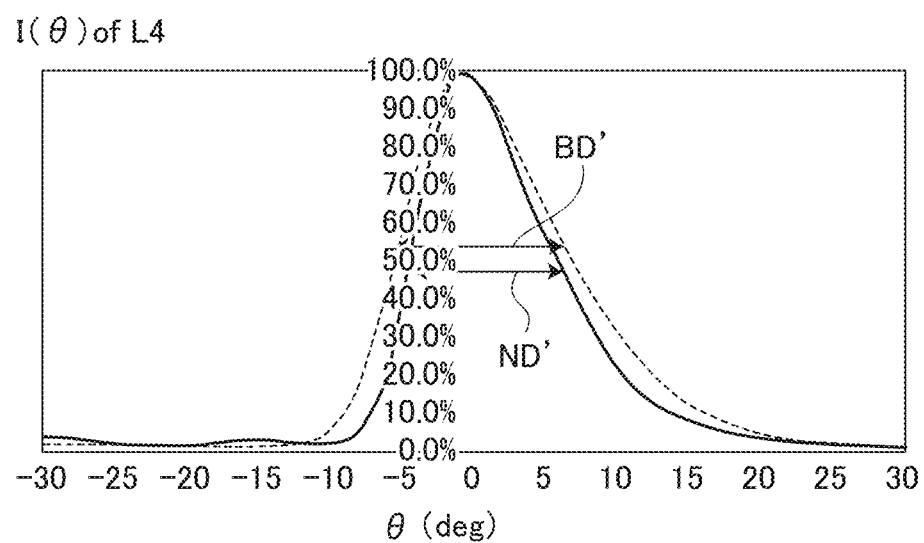
Figure 19A:
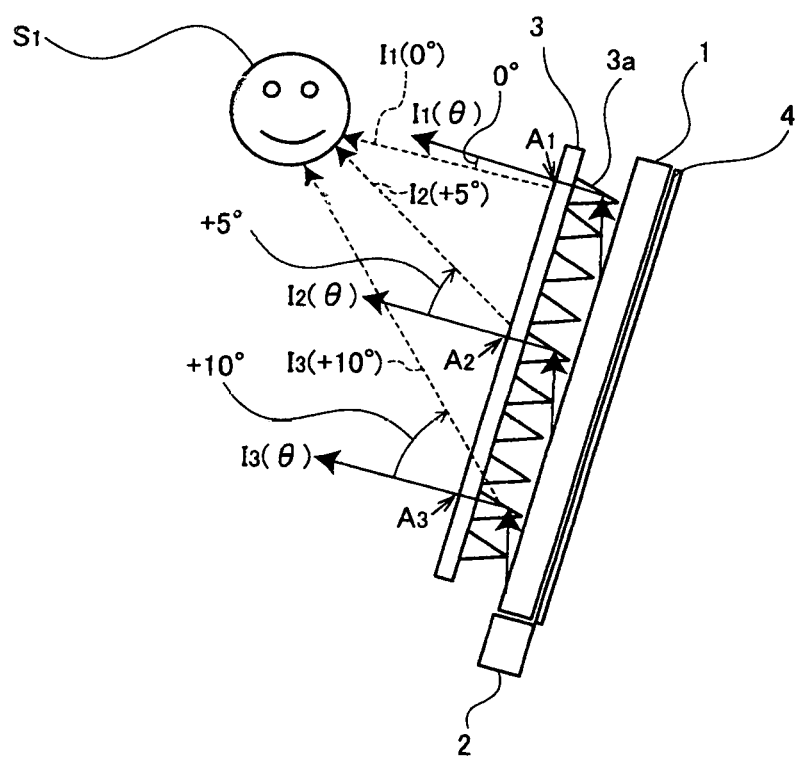
Figure 19B:
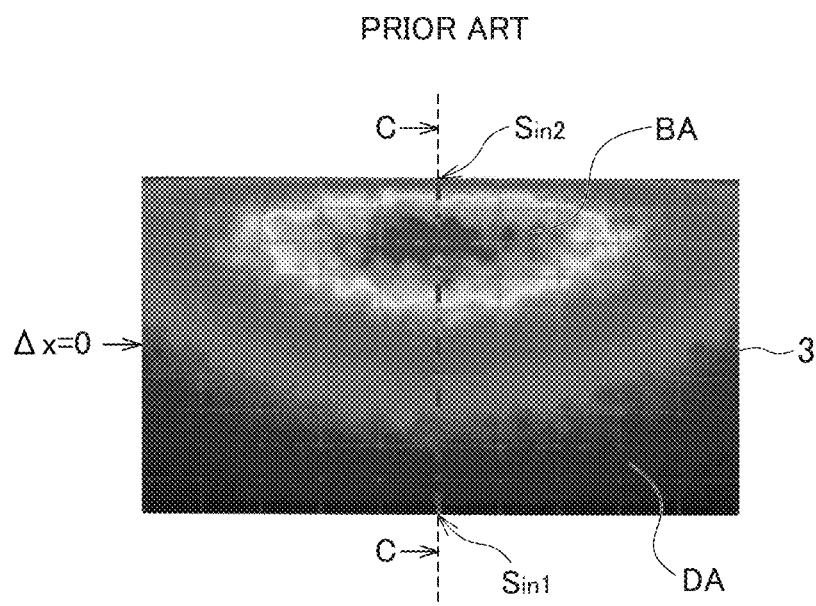
Figure 19C:
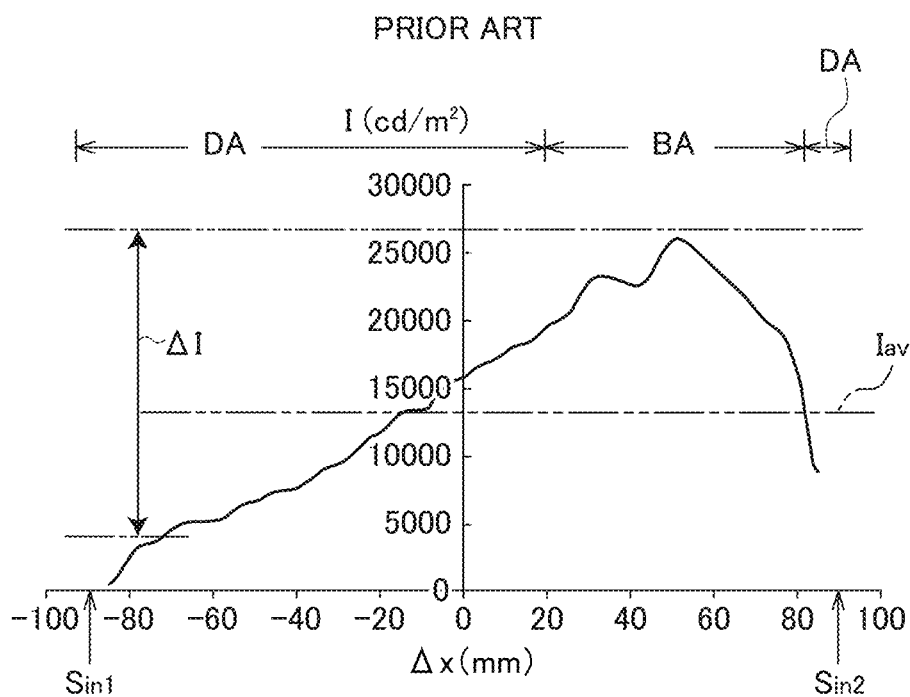
Figure 20A:
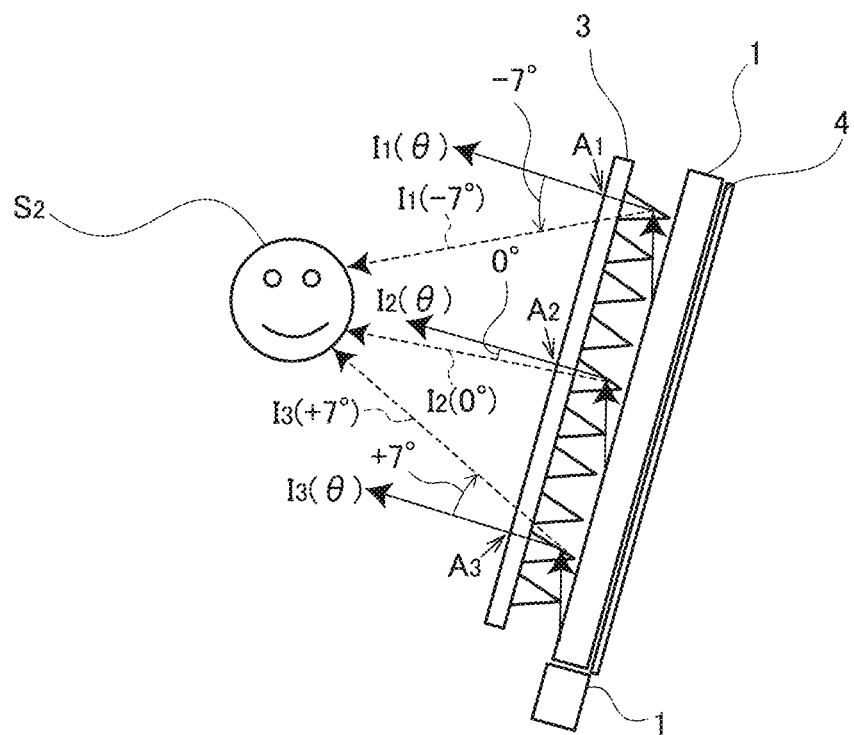
Figure 20B:
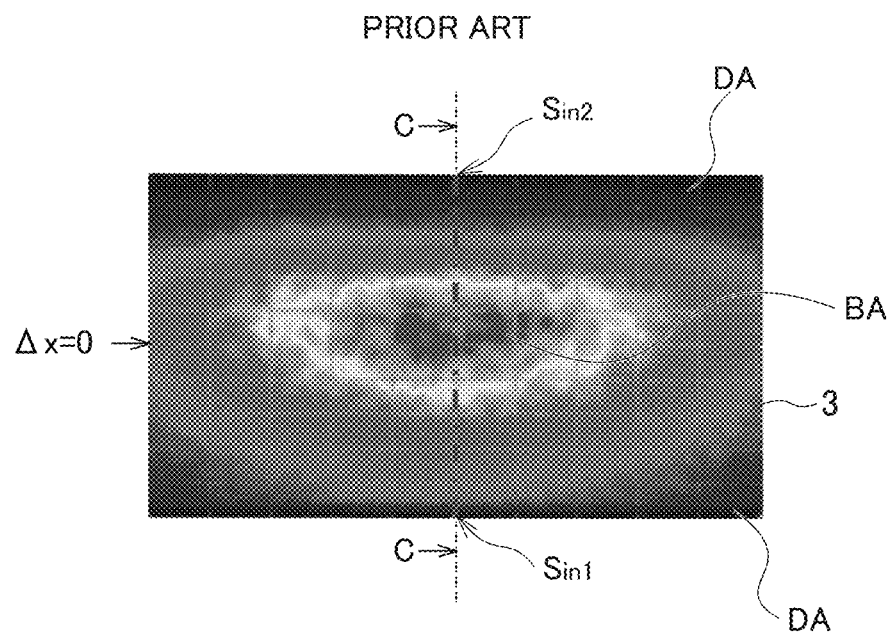
Figure 20C:
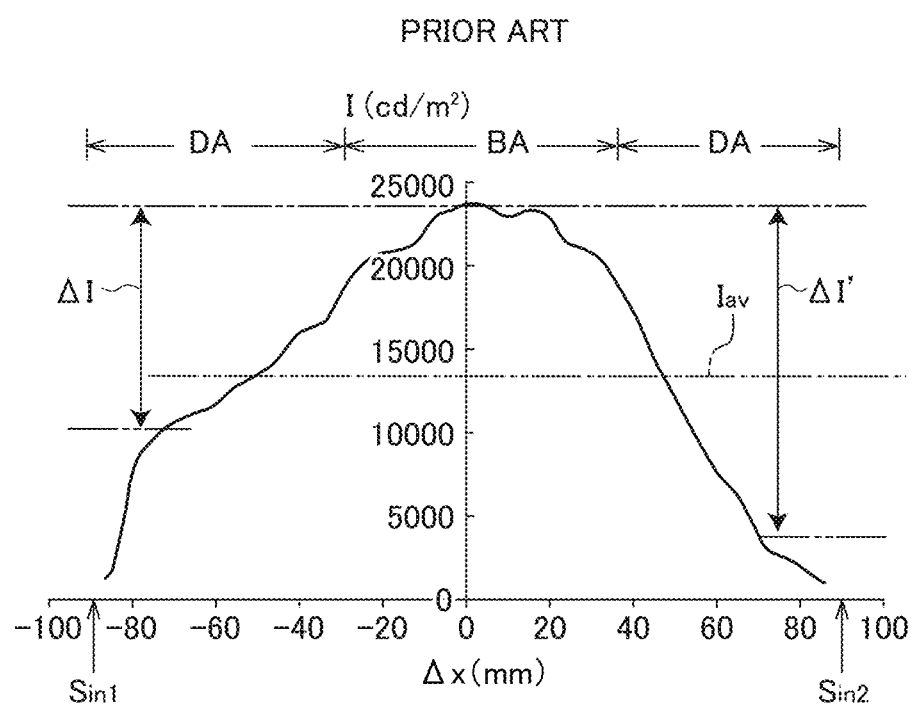
Figure 21A:
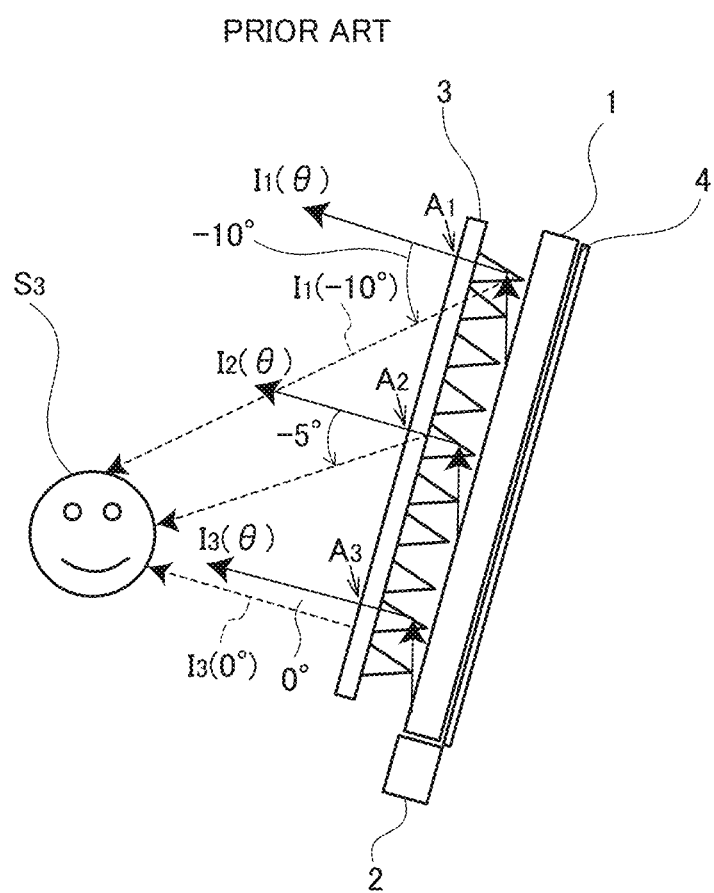
Figure 21B:
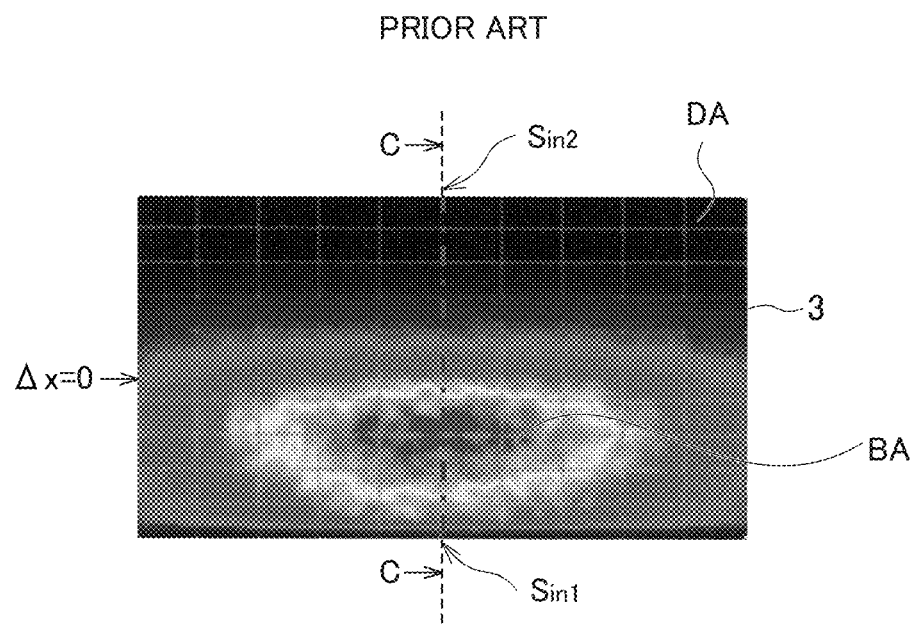
Figure 21C:
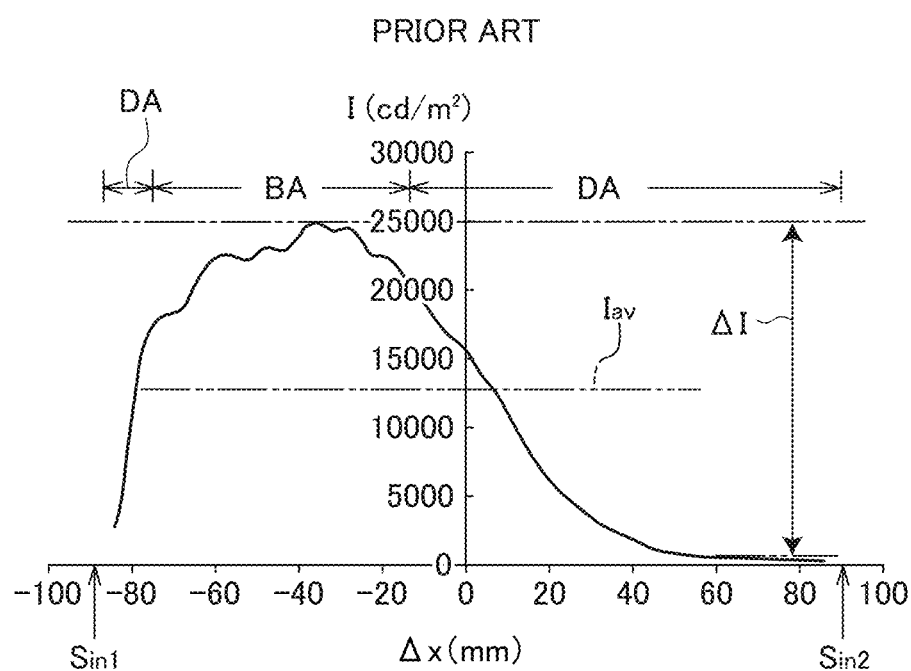

FIGS. 13A, 13B, 13C and 13D are views for explaining an example of a method for manufacturing the prism sheets 3' and 3" of FIGS. 12A and 12C;

FIG. 14 is a perspective view illustrating a prior side-edge type surface light emitting apparatus;

FIG. 15 is a perspective view of the light guide plate of FIG. 14;

FIG. 16A is a bottom view of the light guide plate of FIG. 15;

FIG. 16B is a partial cross-sectional view of FIG. 16A;

FIG. 17 is a cross-sectional view for explaining the operation of the light guide plate and the prism sheet of FIG. 14;

FIG. 18A is a diagram showing the luminous intensity distribution of the light guide plate of FIG. 17;

FIG. 18B is a diagram showing the luminous intensity distribution of the prism sheet of FIG. 17;

FIG. 19A is a view for explaining the upper-side located viewpoint of the side-edge type surface light emitting apparatus of FIG. 14;

FIG. 19B is a luminous intensity distribution on the outer surface of the prism sheet viewed from the upper-side located viewpoint of FIG. 19A;

FIG. 19C is a graph of the luminous intensity distribution taken along the line C-C of FIG. 19B;

FIG. 20A is a view for explaining the center-side located viewpoint of the side-edge type surface light emitting apparatus of FIG. 14;

FIG. 20B is a luminous intensity distribution on the outer surface of the prism sheet viewed from the -center-side located viewpoint of FIG. 20A;

FIG. 20C is a graph of the luminous intensity distribution taken along the line C-C of FIG. 20B;

FIG. 21A is a view for explaining the lower-side located viewpoint of the side-edge type surface light emitting apparatus of FIG. 14;

FIG. 21B is a luminous intensity distribution on the outer surface of the prism sheet viewed from the lower-side located viewpoint of FIG. 21A; and FIG. 21C is a graph of the luminous intensity distribution taken along the line C-C of FIG. 21B.

DETAILED DESCRIPTION OF EXEMPLARY EMBODIMENTS

Figure 1:
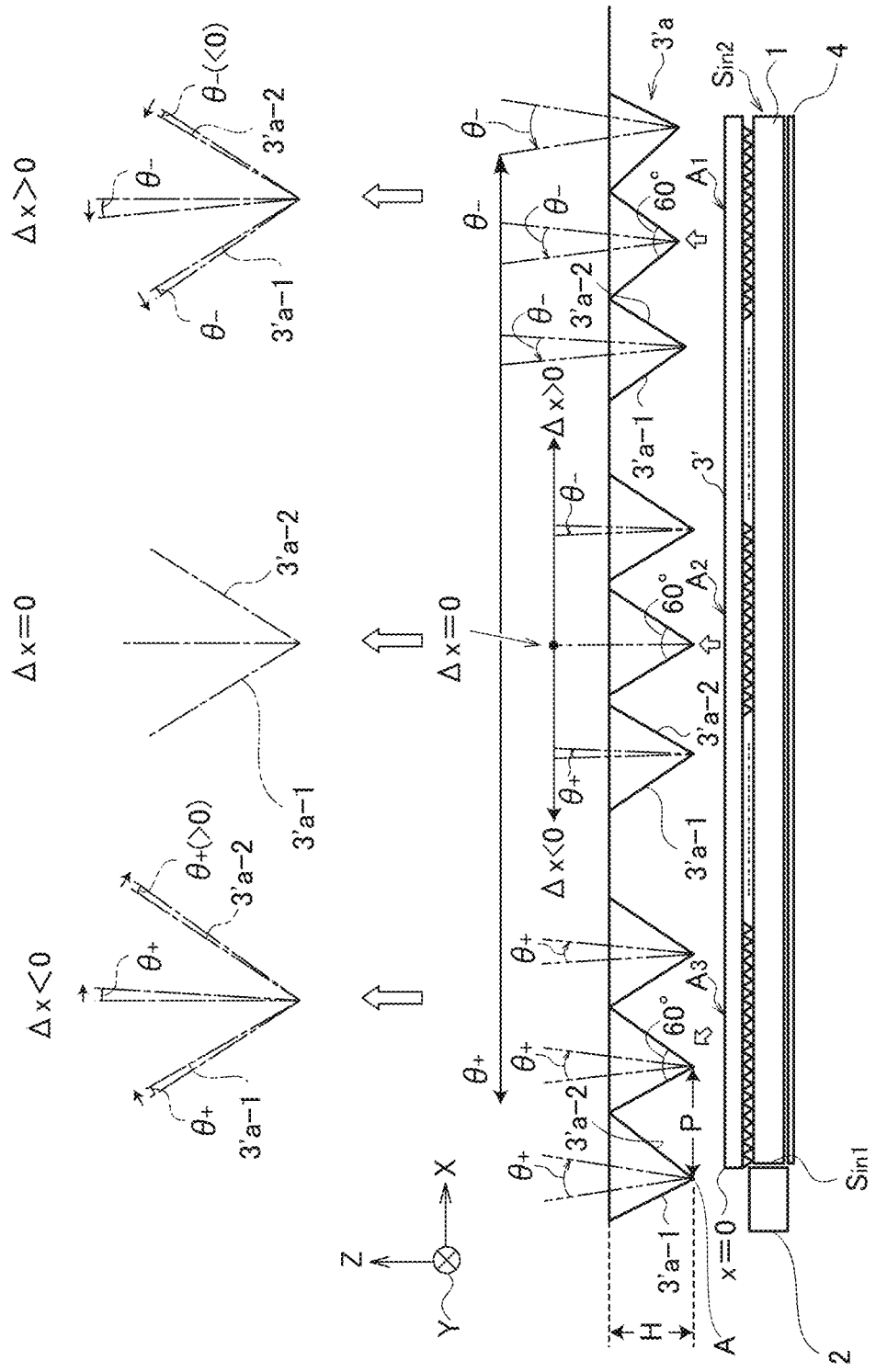
FIG. 1 is a perspective view illustrating an embodiment of the side-edge type surface light emitting apparatus according to the presently disclosed subject matter.

In FIG. 1, which is a cross-sectional view illustrating an embodiment of the side-edge type surface light emitting apparatus according to the presently disclosed subject matter, a single-face prism sheet 3' is provided instead of the single-face prism sheet 3 of FIG. 14.

In FIG. 1, the single-face prism sheet 3' has multiple triangular-shaped prisms 3'a each having the same triangular shape formed by a light incident surface 3'a-1 and a light reflecting surface 3'a-2, where the apical angle of an apex A is definite, for example, 60°, the pitch P is definite and the height H is definite. Here, the origin (x=0) of the X-coordinate is defined by the location of the light incident surface $S_{in1}$ and Δ x is the deviation from the center location of the prism sheet 3' corresponding to the center between the light incident surface $S_{in1}$ and the counter incident surface $S_{in2}$. Conventionally, the viewpoint $S_2$ (not shown) is located above the center location of the prism sheet 3'.

In a $\theta_+$ region where Δ x≤0, the triangular-shaped prisms 3'a are gradually rotated by an angle of $\theta_+$ ($\theta_+ \geq 0$) with respect to their apexes A in the clockwise direction viewed from the negative side of the Y-direction, so that the light incident surfaces 3'a-1 rise and the light reflecting surfaces 3'a-2 fall. In this case, the farther the triangular-shaped prisms 3'a from the center location Δ x=0, the larger the angle $\theta_+$. In other words, the nearer the triangular-shaped prisms 3'a to the light incident surface $S_{in1}$, the larger the angle $\theta_+$. On the other hand, in a $\theta_-$ region where Δ x>0, the triangular-shaped prisms 3'a are gradually rotated by an angle of $\theta_-$ ($\theta_- < 0$) with respect to their apexes A in the counter clockwise direction viewed from the negative side of the Y-direction, so that the light incident surfaces 3'a-1 fall and the light reflecting surfaces 3'a-2 rise. In this case, the farther the triangular-shaped prisms 3'a from the center location Δ x=0, the larger the angle $\theta_-$. In other words, the nearer the triangular-shaped prisms 3'a to the counter light incident surfaces $S_{in2}$, the larger the angle $\theta_-$.

For example, assume that d is the distance between the viewpoint $S_2$ and the prism sheet 3'. In this case, if d=400 mm, $$\theta_+ = -0.0565 \cdot \Delta x (\Delta x \leq 0)$$

$$\theta_- = -0.0565 \cdot \Delta x (\Delta x > 0)$$

Also, if d=500 mm, $$\theta_+ = -0.0446 \cdot \Delta x (\Delta x \leq 0)$$

$$\theta_- = -0.0446 \cdot \Delta x (\Delta x > 0)$$

Further, if d=600 mm, $$\theta_+ = -0.0381 \cdot \Delta x (\Delta x \leq 0)$$

$$\theta_- = -0.0381 \cdot \Delta x (\Delta x > 0)$$

Still, if d=700 mm, $$\theta_+ = -0.0305 \cdot \Delta x (\Delta x \leq 0)$$

$$\theta_- = -0.0305 \cdot \Delta x (\Delta x > 0).$$

Furthermore, if d=800 mm, $$\theta_+ = -0.0286 \cdot \Delta x (\Delta x \leq 0)$$

$$\theta_- = -0.0286 \cdot \Delta x (\Delta x > 0)$$

Generally, $$\theta = \theta_+(\theta_-) = a \cdot \Delta x$$

where a=−0.0285∼−0.0446

The above equation can be represented by $$\theta = a \cdot x + b$$

where x is the X-coordinate of the triangular-shaped prism 3'a;

b is the angle of the triangular-shaped prism 3'a at the incident light surface $S_{in1}$.

Of course, when the location of the viewpoint is changed, the above equations would be changed.

Figure 2A:
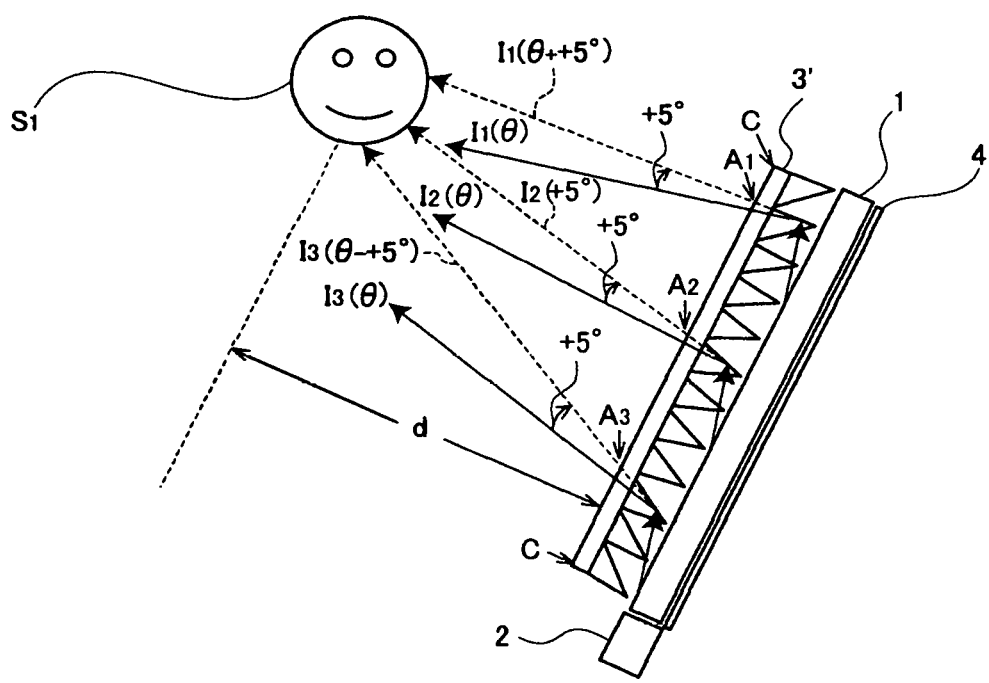
FIG. 2A is a view for explaining the upper-side located viewpoint of the side-edge type surface light emitting apparatus of FIG. 1.
Figure 2B:
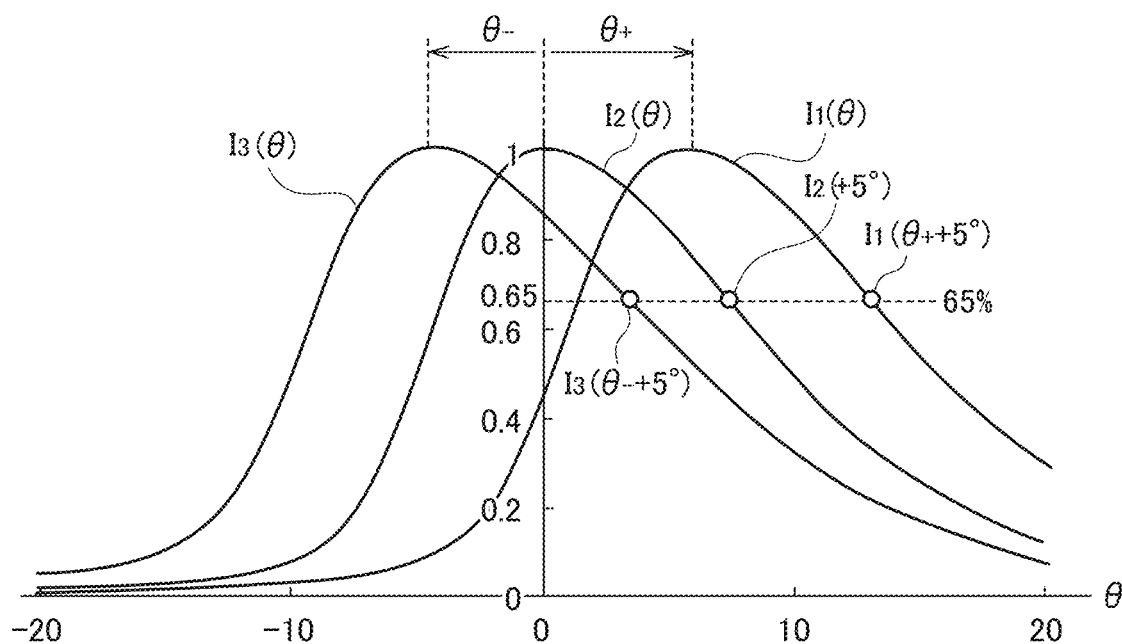
FIG. 2B is a luminous intensity distribution on each of the light emitting areas of the prism sheet viewed from the upper-side located viewpoint of FIG. 2A.
Figure 2C:
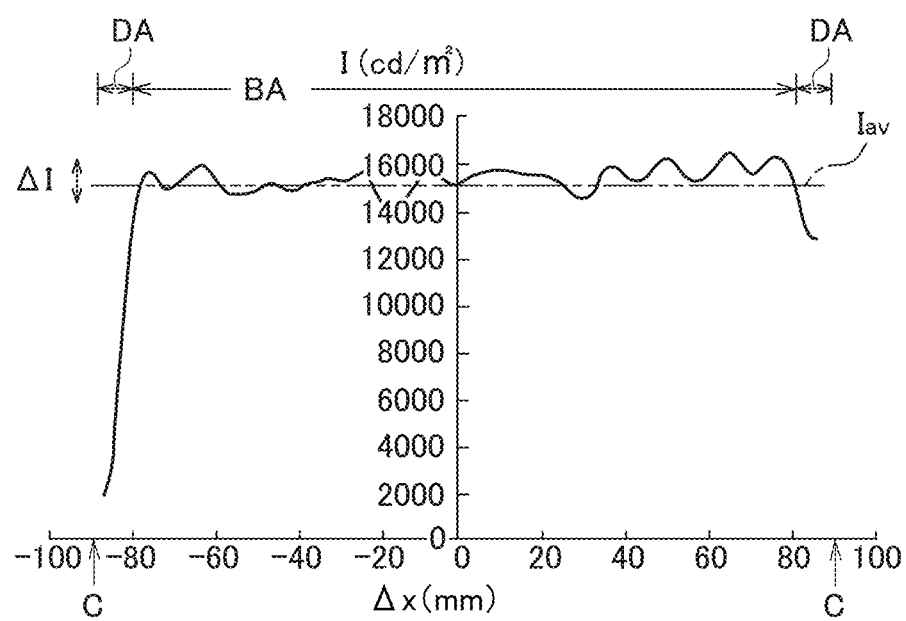
FIG. 2C is a graph of the luminous intensity distribution viewed from the upper-side located viewpoint taken along the vertical line C-C of FIG. 2A.

FIG. 2A is a view for explaining the upper-side located viewpoint $S_1$ of the side-edge type surface light emitting apparatus of FIG. 1, FIG. 2B is a luminous intensity distribution on each of the light emitting areas $A_1$, $A_2$ and $A_3$ of the prism sheet 3' viewed from the upper-side located viewpoint $S_1$ of FIG. 2A, and FIG. 2C is a graph of the luminous intensity distribution viewed from the upper-side located viewpoint $S_1$ taken along the vertical line C-C of FIG. 2A.

As illustrated in FIG. 2A, the upper-side located viewpoint $S_1$ is located at an angle of +5° with respect to a normal at the center of the prism sheet 3'. In this case, the luminous intensity distribution viewed from the upper-side located viewpoint $S_1$ is equally subjected to the luminous intensity $I_1(\theta_+ +5°)$ of light propagated from the upper-side light emitting area $A_1$ of the prism sheet 3' to the upper-side located viewpoint $S_1$, the luminous intensity $I_2 (+5°)$ of light propagated from the center-side light emitting area $A_2$ of the prism sheet 3' to the upper-side located viewpoint $S_1$ and the luminous intensity $I_3 (\theta_- +5°)$ of light propagated from the lower-side light emitting area $A_3$ of the prism sheet 3' to the upper-side located viewpoint $S_1$. In this case, as illustrated in FIG. 2B, the upper-side light emitting area $A_1$ has a luminous intensity distribution $I_1 (\theta)$ which is similar to the luminous intensity distribution $I_2 (\theta)$ of the center-side light emitting area $A_2$ but is shifted by the azimuth angle $\theta_+$. Also, the lower-side light emitting area $A_3$ has a luminous intensity distribution $I_3 (\theta)$ which is similar to the luminous intensity distribution $I_2 (\theta)$ of the center-side light emitting area $A_2$ but is shifted by the azimuth angle $\theta_-$. That is, $$I_1(\theta+\theta_+) \approx I_2(\theta) \approx I_3(\theta+\theta_-)$$

where $I_1(\theta)$ is symmetrical with respect to $\theta=\theta_+$;
$I_2(\theta)$ is symmetrical with respect to $\theta=0°$; and
$I_3(\theta)$ is symmetrical with respect to $\theta=\theta_-$.

In FIG. 2B, the luminous intensity $I_1 (\theta_+ +5°)$ is 65% of the luminous intensity $I_1 (\theta_+)$, the luminous intensity $I_2 (+5°)$ is 65% of the luminous intensity $I_2 (0°)$, and the luminous intensity $I_3 (\theta_- +5°)$ is 65% of the luminous intensity $I_3 (\theta_-)$. In this case, since $I_1(\theta_+) \approx I_2 (0°) \approx I_3 (\theta_-)$, $$I_1(\theta_+ +5°) \approx I_2(+5°) \approx I_3(\theta_- +5°)$$

Thus, the luminous intensity distribution viewed from the upper-side located viewpoint $S_1$ is equally subjected to $I_1 (\theta_+ +5°)$, $I_2 (+5°)$ and $I_3 (\theta_- +5°)$ which are equal to each other.

As illustrated in FIG. 2C, which is a graph of the luminous intensity distribution viewed from the upper-side located viewpoint $S_1$ taken along the vertical line C-C of FIG. 2A, the average luminous intensity $I_{av}$ is small, i.e., about 15000 cd/m$^2$, but the difference $\Delta I$ in luminous intensity is very small. Also, a large bright area (bright line) BA is formed while small dark areas (dark bands) DA are formed. In FIG. 2C, note that $\Delta x$ is the deviation from the center of the vertical line C-C of FIG. 2A.

Figure 3A:
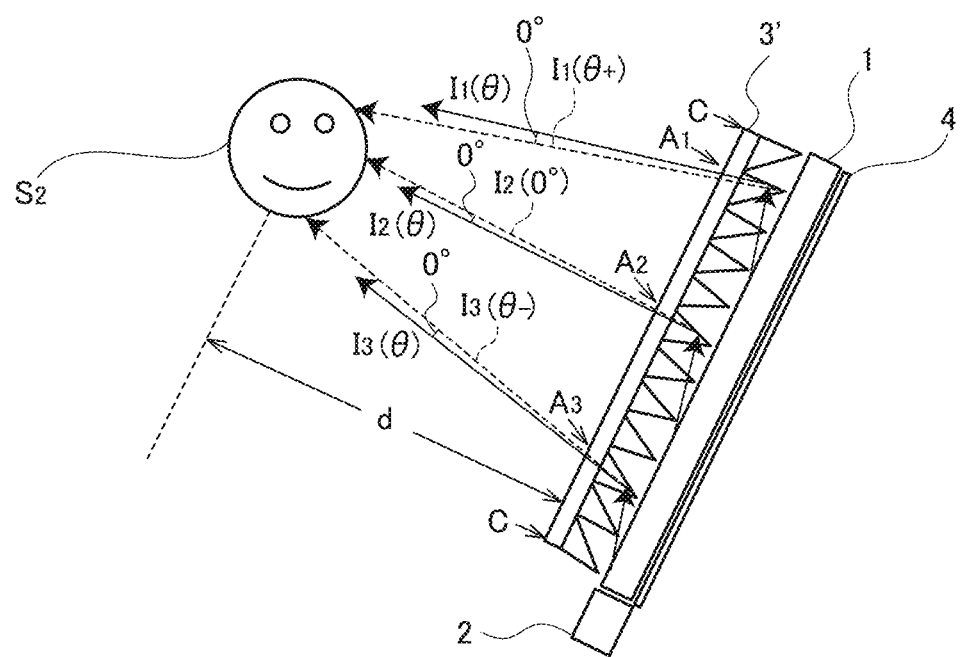
FIG. 3A is a view for explaining the center-side located viewpoint of the side-edge type surface light emitting apparatus of FIG. 1.
Figure 3B:
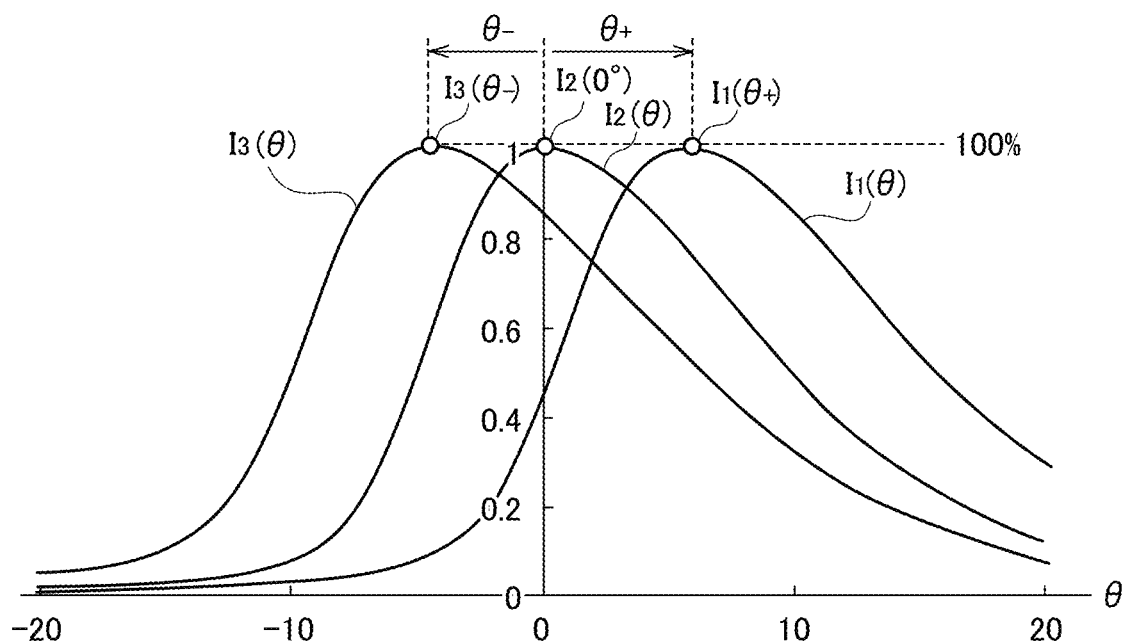
FIG. 3B is a luminous intensity distribution on each of the light emitting areas of the prism sheet viewed from the center-side located viewpoint of FIG. 3A.
Figure 3C:
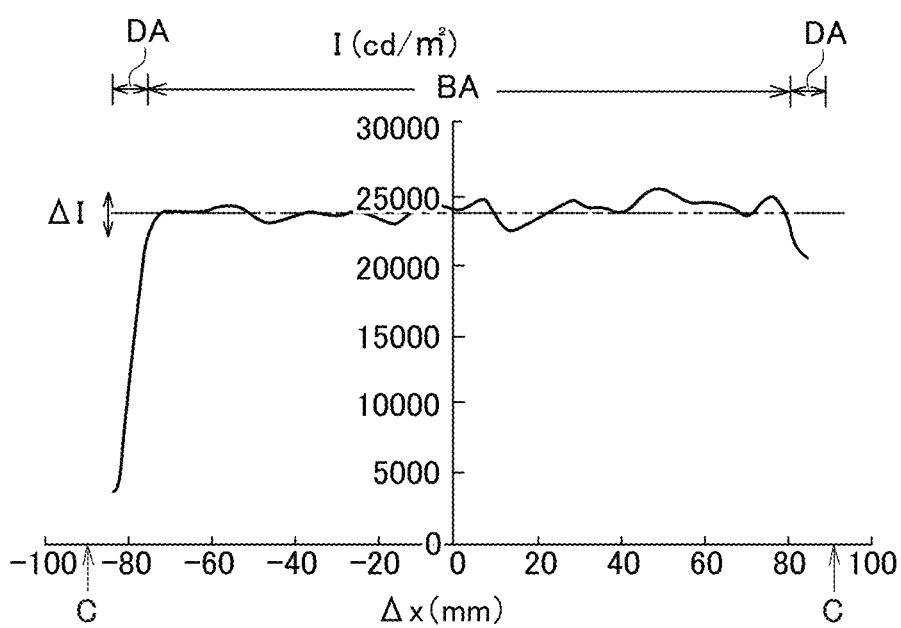
FIG. 3C is a graph of the luminous intensity distribution viewed from the center-side located viewpoint taken along the vertical line C-C of FIG. 3A.

FIG. 3A is a view for explaining the center-side located viewpoint $S_2$ of the side-edge type surface light emitting apparatus of FIG. 1, FIG. 3B is a luminous intensity distribution on each of the light emitting areas $A_1$, $A_2$ and $A_3$ of the prism sheet 3' viewed from the center-side located viewpoint $S_2$ of FIG. 3A, and FIG. 3C is a graph of the luminous intensity distribution viewed from the center-side located viewpoint $S_2$ taken along the vertical line C-C of FIG. 3A.

As illustrated in FIG. 3A, the center-side located viewpoint $S_2$ is located on a normal at the center of the prism sheet 3'. In this case, the luminous intensity distribution viewed from the center-side located viewpoint $S_2$ is equally subjected to the luminous intensity $I_1 (\theta_+)$ of light propagated from the upper-side light emitting area $A_1$ of the prism sheet 3' to the center-side located viewpoint $S_2$, the luminous intensity $I_2 (0°)$ of light propagated from the center-side light emitting area $A_2$ of the prism sheet 3' to the center-side located viewpoint $S_2$ and the luminous intensity $I_3 (\theta_-)$ of light propagated from the lower-side light emitting area $A_3$ of the prism sheet 3' to the center-side located viewpoint $S_2$. Even in this case, as illustrated in FIG. 3B, $$I_1(\theta+\theta_+) \approx I_2(\theta) \approx I_3(\theta+\theta_-)$$

where $I_1(\theta)$ is symmetrical with respect to $\theta=\theta_+$;
$I_2(\theta)$ is symmetrical with respect to $\theta=0°$; and
$I_3(\theta)$ is symmetrical with respect to $\theta=\theta_-$.

In FIG. 3B, the luminous intensity $I_1 (\theta_+)$ is 100% of the luminous intensity $I_1 (\theta_+)$, the luminous intensity $I_2 (0°)$ is 100% of the luminous intensity $I_2 (0°)$, and the luminous intensity $I_3 (\theta_-)$ is 100% of the luminous intensity $I_3 (\theta_-)$. In this case, $I_1 (\theta_+) \approx I_2 (0°) \approx I_3 (\theta_-)$.

Thus, the luminous intensity distribution viewed from the center-side located viewpoint $S_2$ is equally subjected to $I_1 (\theta_+)$, $I_2 (0°)$ and $I_3 (\theta_-)$ which are equal to each other.

As illustrated in FIG. 3C, which is a graph of the luminous intensity distribution viewed from the center-side located viewpoint $S_2$ taken along the vertical line C-C of FIG. 3A, the average luminous intensity $I_{av}$ is large, i.e., about 24000 cd/m$^2$, and the difference $\Delta I$ in luminous intensity is very small. Also, a large bright area (bright line) BA is formed while small dark areas (dark bands) DA are formed. In FIG. 3C, note that $\Delta x$ is the deviation from the center of the vertical line C-C of FIG. 3A.

Figure 4A:
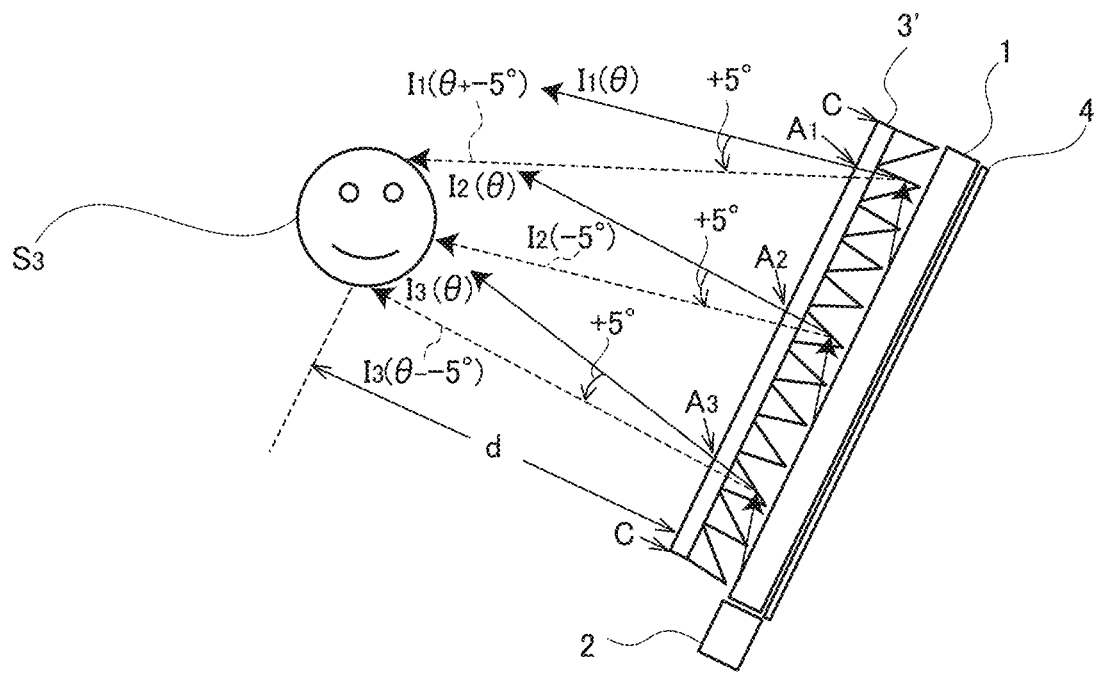
FIG. 4A is a view for explaining the lower-side located viewpoint of the side-edge type surface light emitting apparatus of FIG. 1.
Figure 4B:
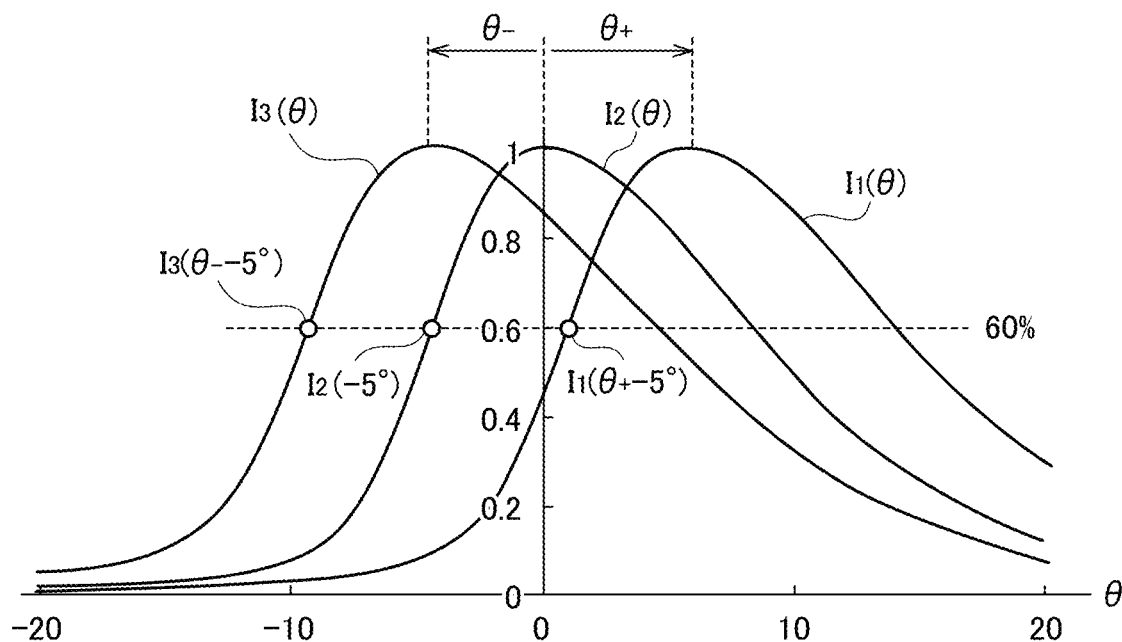
FIG. 4B is a luminous intensity distribution on each of the light emitting areas of the prism sheet viewed from the lower-side located viewpoint of FIG. 4A.
Figure 4C:
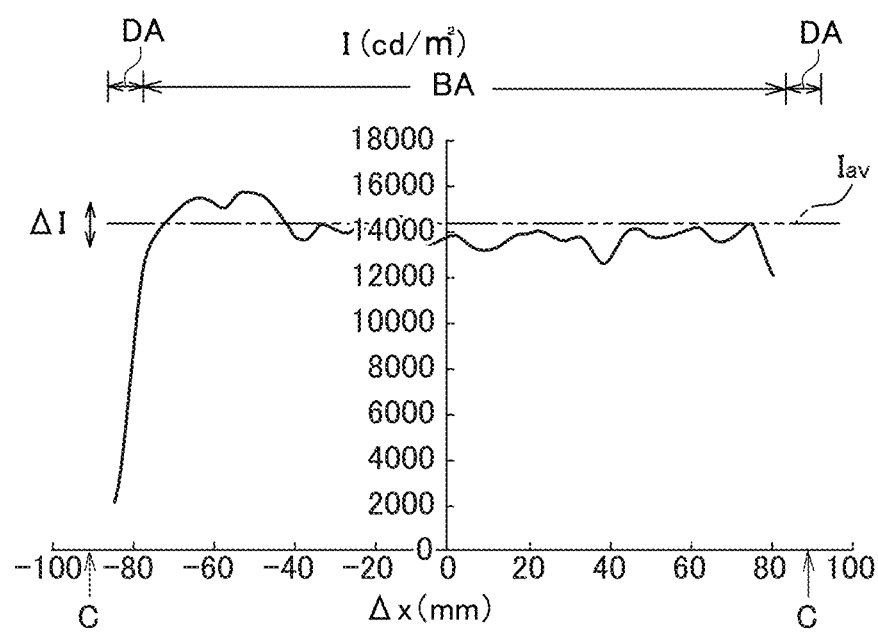
FIG. 4C is a graph of the luminous intensity distribution viewed from the lower-side located viewpoint taken along the vertical line C-C of FIG. 4A.

FIG. 4A is a view for explaining the lower-side located viewpoint $S_3$ of the side-edge type surface light emitting apparatus of FIG. 1, FIG. 4B is a luminous intensity distribution on each of the light emitting areas $A_1$, $A_2$ and $A_3$ of the prism sheet 3' viewed from the lower-side located viewpoint $S_3$ of FIG. 4A, and FIG. 4C is a graph of the luminous intensity distribution viewed from the lower-side located viewpoint $S_3$ taken along the vertical line C-C of FIG. 4A.

As illustrated in FIG. 4A, the lower-side located viewpoint $S_3$ is located at an angle of −5° with respect to a normal at the center of the prism sheet 3'. In this case, the luminous intensity distribution viewed from the lower-side located viewpoint $S_3$ is equally subjected to the luminous intensity $I_1 (\theta_+ -5°)$ of light propagated from the upper-side light emitting area $A_1$ of the prism sheet 3' to the lower-side located viewpoint $S_3$, the luminous intensity $I_2 (-5°)$ of light propagated from the center-side light emitting area $A_2$ of the prism sheet 3' to the lower-side located viewpoint $S_3$ and the luminous intensity $I_3 (\theta_- -5°)$ of light propagated from the lower-side light emitting area $A_3$ of the prism sheet 3' to the lower-side located viewpoint $S_3$. Even in this case, as illustrated in FIG. 4B, $$I_1(\theta+\theta_+) \approx I_2(\theta) \approx I_3(\theta+\theta_-)$$

where $I_1(\theta)$ is symmetrical with respect to $\theta=\theta_+$;
$I_2(\theta)$ is symmetrical with respect to $\theta=0°$; and
$I_3(\theta)$ is symmetrical with respect to $\theta=\theta_-$.

In FIG. 4B, the luminous intensity $I_1 (\theta_+ -5°)$ is 60% of the luminous intensity $I_1 (\theta_+)$, the luminous intensity $I_2 (-5°)$ is 60% of the luminous intensity $I_2(0°)$, and the luminous intensity $I_3 (\theta_- -5°)$ is 60% of the luminous intensity $I_3 (\theta_-)$. In this case, since $I_1 (\theta_+) \approx I_2 (0°) \approx I_3 (\theta_-)$, $$I_1(\theta_+ -5°) \approx I_2(-5°) \approx I_3(\theta_- 5°)$$

Thus, the luminous intensity distribution viewed from the lower-side located viewpoint $S_3$ is equally subjected to $I_1 (\theta_+ -5°)$, $I_2 (-5°)$ and $I_3 (\theta_- -5°)$ which are equal to each other.

As illustrated in FIG. 4C, which is a graph of the luminous intensity distribution viewed from the lower-side located viewpoint $S_3$ taken along the vertical line C-C of FIG. 4A, the average luminous intensity $I_{av}$ is small, i.e., about 14000 cd/m$^2$, but the difference $\Delta I$ in luminous intensity is very small. Also, a large bright area (bright line) BA is formed while small dark areas (dark bands) DA are formed. In FIG. 4C, note that Δx is the deviation from the center of the vertical line C-C of FIG. 4A.

In the side-edge type surface light emitting apparatus of FIG. 1, the average luminous intensity $I_{av}$ viewed from the center-side located viewpoint $S_2$ is large and the average luminous intensities $I_{av}$ viewed from the upper-side located viewpoint $S_1$ and the lower-side located viewpoint $S_3$ are small; however, the luminous intensity distributions viewed from any of the viewpoints $S_1$, $S_2$ and $S_3$ along the vertical direction (C-C) have a small difference ΔI in luminous intensity, i.e., uniformity. Also, when the viewpoint (the viewer's eyes) is moved from the upper side to the lower side or vice versa with the prism sheet 3', the bright area (bright line) BA would not move from the upper side to the lower side or vice versa due to the large size thereof, so that the dark area (dark band) DA would not be emphasized from the viewpoint of the viewer due to the small size thereof.

FIG. 5 depicts photos of the luminous intensity distributions of the side-edge type surface light emitting apparatus of FIG. 1 where the distance d between the viewpoint and the prism sheet 3' is 600 mm and the focal length F of the prism sheet 3' is changed and the emitting light L2 of the light guide plate 1 has a narrow distribution ND of FIG. 18A whose full width at half maximum is 30° to 15°.

Figure 6A:
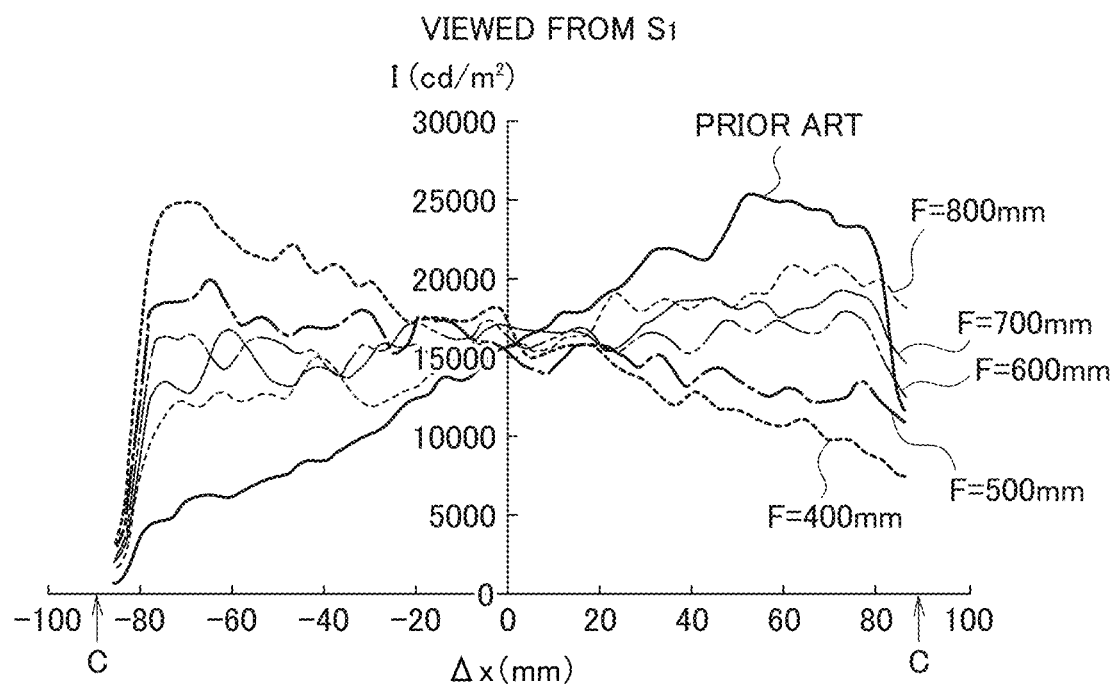
FIG. 6A is a luminous intensity distribution of the vertical direction C-C of the prism sheet of FIG. 2A viewed from the upper-side located viewpoint $S_1$ in FIG. 5.
Figure 6B:
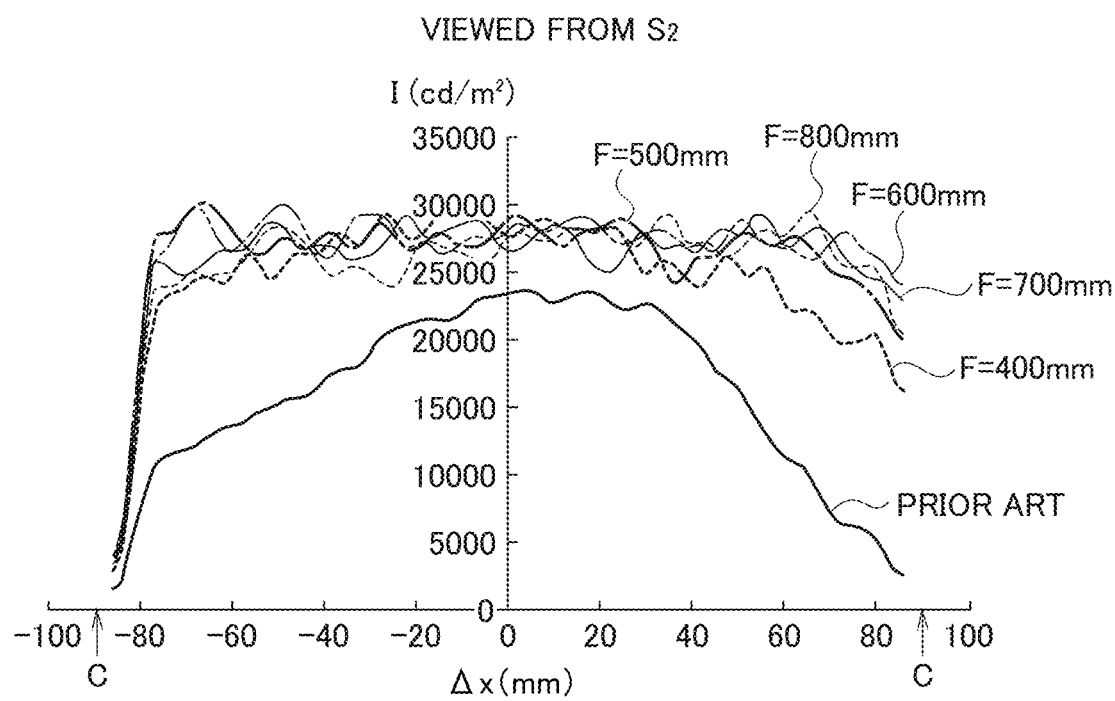
FIG. 6B is a luminous intensity distribution of the vertical direction C-C of the prism sheet of FIG. 3A viewed from the center-side located viewpoint in FIG. 5.

FIG. 6A is a luminous intensity distribution of the vertical direction C-C of the prism sheet 3' of FIG. 2A viewed from the upper-side located viewpoint $S_1$ in FIG. 5, FIG. 6B is a luminous intensity distribution of the vertical direction C-C of the prism sheet 3' of FIG. 3A viewed from the center-side located viewpoint $S_2$ in FIG. 5, and FIG. 6C is a luminous intensity distribution of the vertical direction C-C of the prism sheet 3' of FIG. 4A viewed from the lower-side located viewpoint $S_3$ in FIG. 5.

As illustrated in FIGS. 5, 6A, 6B and 6C, when the focal length F coincides with the distance d (=600 mm), the average luminous intensity $I_av$ viewed from the center-side located viewpoint $S_2$ is large, i.e., 27000 cd/m² while the average luminous intensities $I_{av}$ viewed from the upper-side located viewpoint $S_1$ and the lower-side located viewpoint $S_3$ are low, i.e., 16000 cd/m², but the difference ΔI in luminous intensity viewed from any of the viewpoints $S_1$, $S_2$ and $S_3$ is very small, so that the luminous intensity can be uniform. Therefore, when the viewpoint is moved from an upper location to a lower location or vice versa, the bright area BA would hardly be moved, so that the dark area DA would not be emphasized. On the other hand, when the focal length F is 400~500 mm or 700~800 mm, the difference Δ I in luminous intensity viewed from any of the viewpoints $S_1$, $S_2$ and $S_3$ become large, so that the resolution of the focal length F by the gradual change of the rotational angle $\theta_+$ ($\theta_-$) of the triangular prisms 3'a can be increased by the narrow distribution characteristic. Therefore, when the distance d between the viewpoint and the prism sheet 3' is 600 mm, the focal length F is preferably 600 to 700 mm.

FIG. 7 depicts photos of the luminous intensity distributions of the side-edge type surface light emitting apparatus of FIG. 1 where the distance d between the viewpoint and the prism sheet 3' is 600 mm and the focal length F of the prism sheet 3' is changed and the emitting light L2 of the light guide plate 1 has a broad distribution BD of FIG. 18A whose full width at half maximum is larger than 30° to 15°.

Figure 8A:
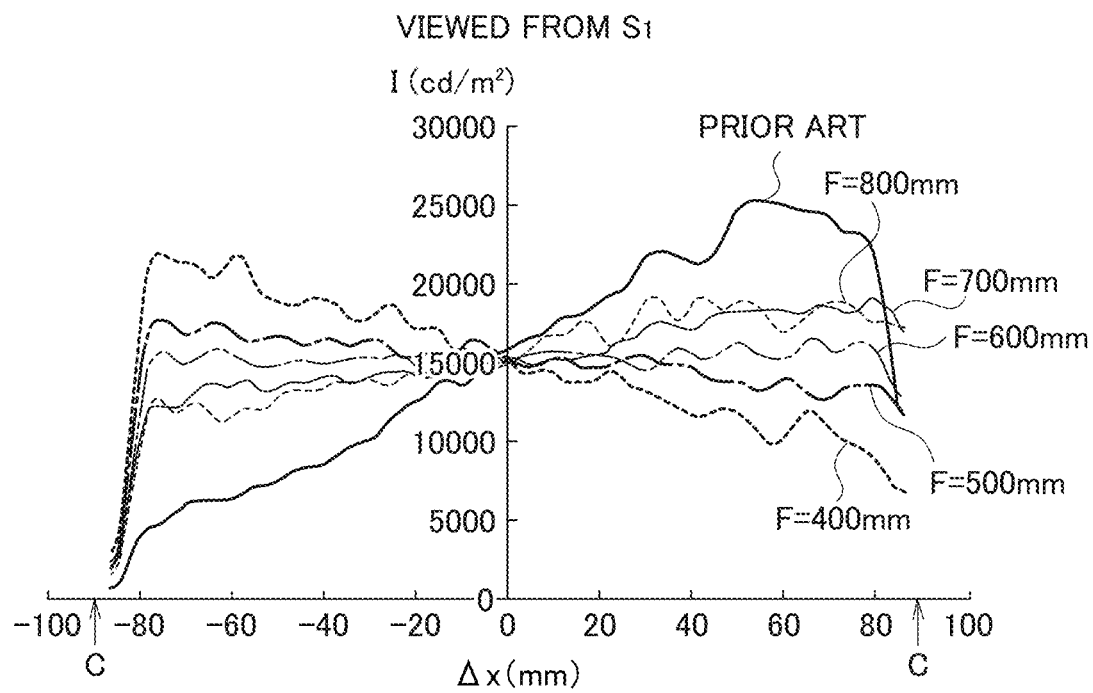
FIG. 8A is a luminous intensity distribution of the vertical direction C-C of the prism sheet of FIG. 2A viewed from the upper-side located viewpoint in FIG. 7.
Figure 8B:
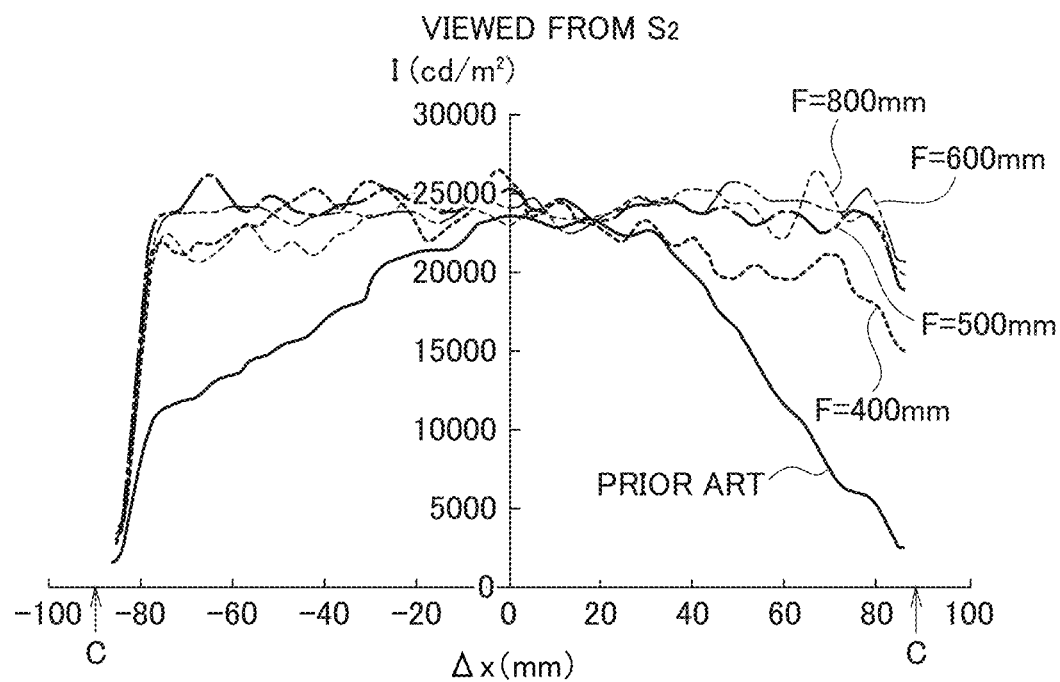
FIG. 8B is a luminous intensity distribution of the vertical direction C-C of the prism sheet of FIG. 3A viewed from the center-side located viewpoint in FIG. 7.
Figure 8C:
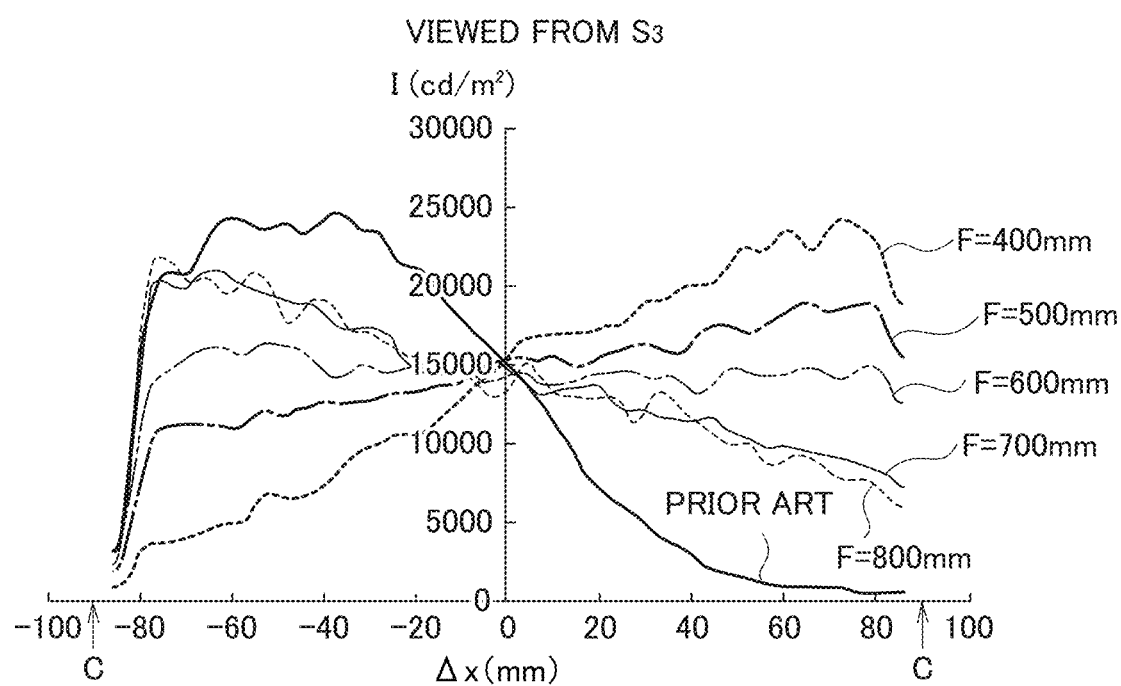
FIG. 8C is a luminous intensity distribution of the vertical direction C-C of the prism sheet of FIG. 4A viewed from the lower-side located viewpoint in FIG. 7.

FIG. 8A is a luminous intensity distribution of the vertical direction C-C of the prism sheet 3' of FIG. 2A viewed from the upper-side located viewpoint $S_1$ in FIG. 7, FIG. 8B is a luminous intensity distribution of the vertical direction C-C of the prism sheet 3' of FIG. 3A viewed from the center-side located viewpoint $S_2$ in FIG. 7, and FIG. 8C is a luminous intensity distribution of the vertical direction C-C of the prism sheet 3' of FIG. 4A viewed from the lower-side located viewpoint $S_3$ in FIG. 7.

As illustrated in FIGS. 7, 8A, 8B and 8C, when the focal length F coincides with the distance d (=600 mm), the average luminous intensity $I_{av}$ viewed from the center-side located viewpoint $S_2$ is large, i.e., 27000 cd/m² while the average luminous intensities $I_{av}$ viewed from the upper-side located viewpoint $S_1$ and the lower-side located viewpoint $S_3$ are low, i.e., 15000~16000 cd/m², but the difference Δ I in luminous intensity viewed from any of the viewpoints $S_1$, $S_2$ and $S_3$ is very small, so that the luminous intensity can be uniform. Therefore, when the viewpoint is moved from an upper location to a lower location or vice versa, the bright area BA would hardly be moved, so that the dark area DA would not be emphasized. On the other hand, when the focal length F is 400~500 mm or 700~800 mm, the difference Δ I in luminous intensity viewed from any of the viewpoints $S_1$, $S_2$ and $S_3$ become large, so that the resolution of the focal length F by the gradual change of the rotational angle $\theta_+$ ($\theta_-$) of the triangular prisms 3'a can be decreased by the broad distribution characteristic. Therefore, when the distance d between the viewpoint and the prism sheet 3' is 600 mm, the focal length F is preferably 600 to 650 mm.

Thus, when the emitting light of the light guide plate 1 has a narrow distribution characteristic ND as illustrated in FIG. 18A, the resolution of the focal length F by the gradual change of the rotational angle $\theta_+$ ($\theta_-$) of the triangular-shaped prisms 3'a can be increased by the principle of superposition of the distributions.

FIG. 9 depicts photos of the luminous intensity distributions of the side-edge type surface light emitting apparatus of FIG. 1 where the distance d between the viewpoint and the prism sheet 3' is 500 mm and the focal length F of the prism sheet 3' is changed and the emitting light L2 of the light guide plate 1 has a narrow distribution ND of FIG. 18A whose full width at half maximum is 30° to 15°.

Figure 10A:
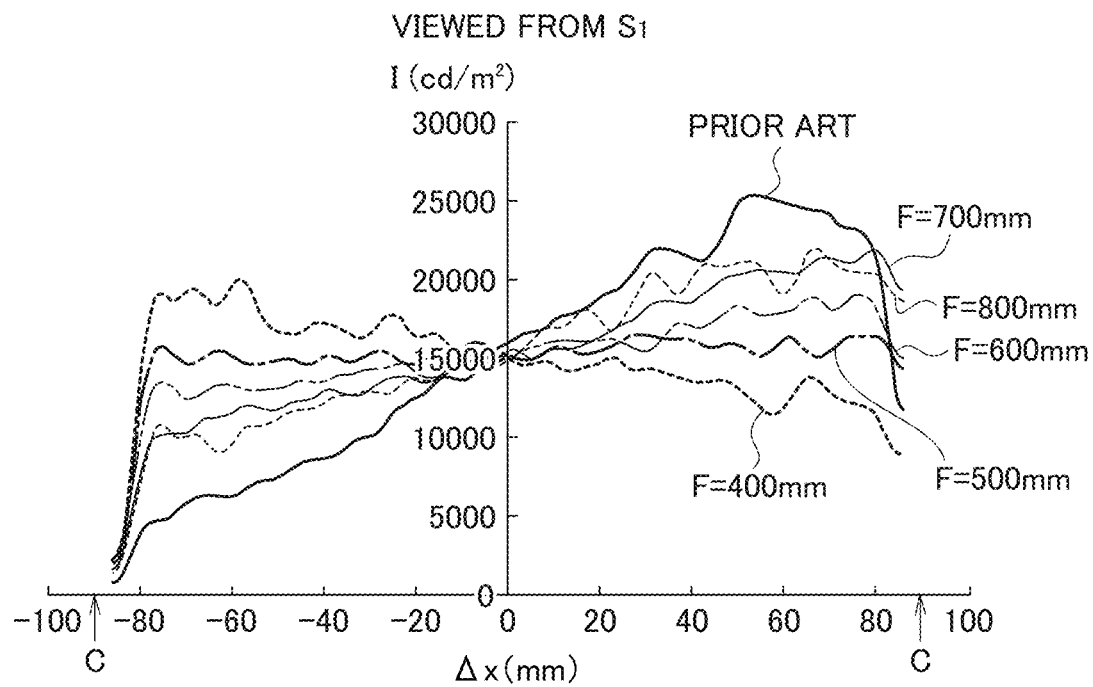
FIG. 10A is a luminous intensity distribution of the vertical direction C-C of the prism sheet of FIG. 2A viewed from the upper-side located viewpoint $S_1$ in FIG. 9.
Figure 10B:
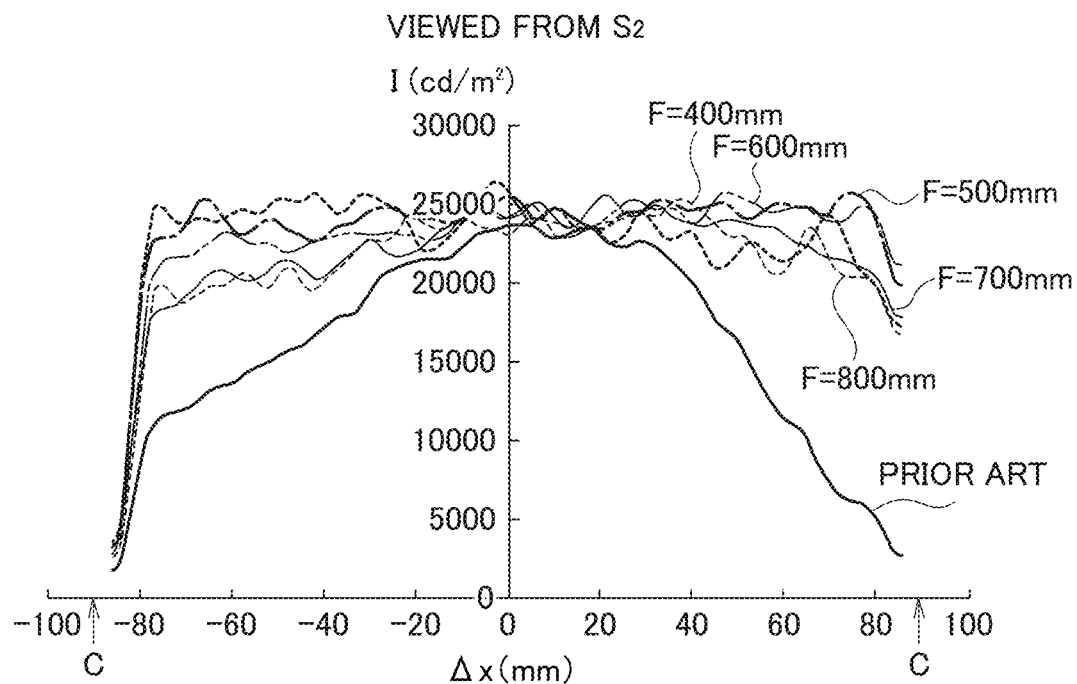
FIG. 10B is a luminous intensity distribution of the vertical direction C-C of the prism sheet of FIG. 3A viewed from the center-side located viewpoint in FIG. 9.

FIG. 10A is a luminous intensity distribution of the vertical direction C-C of the prism sheet 3' of FIG. 2A viewed from the upper-side located viewpoint $S_1$ in FIG. 9, FIG. 10B is a luminous intensity distribution of the vertical direction C-C of the prism sheet 3' of FIG. 3A viewed from the center-side located viewpoint $S_2$ in FIG. 9, and FIG. 10C is a luminous intensity distribution of the vertical direction C-C of the prism sheet 3' of FIG. 4A viewed from the lower-side located viewpoint $S_3$ in FIG. 9.

As illustrated in FIGS. 9, 10A, 10B and 10C, when the focal length F coincides with the distance d (=500 mm), the average luminous intensity $I_{av}$ viewed from the center-side located viewpoint $S_2$ is large, i.e., 27000 cd/m² while the average luminous intensities $I_{av}$ viewed from the upper-side located viewpoint $S_1$ and the lower-side located viewpoint $S_3$ are low, i.e., 14000~15000 cd/m², but the difference Δ I in luminous intensity viewed from any of the viewpoints $S_1$, $S_2$ and $S_3$ is very small, so that the luminous intensity can be uniform. Therefore, when the viewpoint is moved from an upper location to a lower location or vice versa, the bright area BA would hardly be moved, so that the dark area DA would not be emphasized. On the other hand, when the focal length F is 400 mm or 600 mm, the difference Δ I in luminous intensities viewed from the viewpoints $S_1$ and $S_3$ become opposite to each other, so that the resolution of the focal length F by the gradual change of the rotational angle $\theta_+$ ($\theta_-$) of the triangular prisms 3'a can be increased by the narrow distribution characteristic. Therefore, when the distance d between the viewpoint and the prism sheet 3' is 500 mm, the focal length F is preferably 500 mm.

FIG. 11 is a cross-sectional view of the triangular-shaped prisms 3'a of FIG. 1.

As illustrated in FIG. 11, each of the triangular-shaped prisms 3'a has an apex A whose apical angle is definite such as 600, a definite pitch P and a definite height H. In this case, the distance D of a flat portion between the triangular-shaped prisms 3'a defined by the light reflecting surface 3'a-2 of one triangular-shaped prism and the light incident surface 3'a-1 of its adjacent triangular-shaped prism is changed in accordance with the rotational angle θ (θ_) of the triangular prisms 3'a. Therefore, the height H is so determined that the distance D is larger than a predetermined value, regardless of the rotational angle θ_+ (θ_) of the triangular prisms 3'a. As a result, when manufacturing the prism sheet 3' of FIG. 1 using molds, the molds can easily be extracted to enhance the manufacturing yield.

FIGS. 12A, 12B, 12C and 12D are views for explaining modifications of the triangular shaped prisms 3'a of FIG. 1.

Figure 12D:
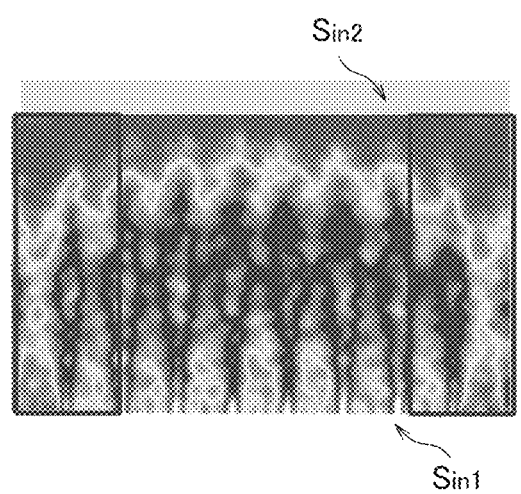
FIG. 12D is a cross-sectional photographic view for explaining a modification of the triangular prism of FIG. 11 where luminous intensity of the prism sheet 3' viewed from the center-side located viewpoint is also uniform along the Y-direction.

In FIG. 1, the triangular-shaped prisms 3'a are provided in parallel with the light incident surface $S_{in1}$, i.e., along with the Y-direction. As a result, as illustrated in FIG. 12B, the luminous intensity of the prism sheet B' viewed from the center-side located viewpoint is uniform along the X-direction but non-uniform along the Y-direction. On the other hand, as illustrated in FIG. 12C, a prism sheet 3" is provided with triangular-shaped prisms 3" a which are concave toward the light incident surface $S_{in1}$. As a result, as illustrated in FIG. 12D, the luminous intensity of the prism sheet 3' viewed from the center-side located viewpoint is also uniform along the Y-direction.

FIGS. 13A, 13B, 13C and 13D are views for explaining an example of a method for manufacturing the prism sheets 3' and 3" of FIGS. 12A and 12C.

Firstly, as illustrated in FIGS. 13A, a prism sheet 3' L larger than a prism sheet 3' is manufactured. Similarly, as illustrated in FIG. 13B, a prism sheet 3" L larger than a prism sheet 3" is manufactured. In FIG. 13A or 13B, the rotational angle θ=0° (Δ x=0) is located at the center of the prism sheet 3' L or 3" L.

Next, as illustrated in FIG. 13A or 13B, when the prism sheet 3' L or 3" L is cut at a cut position C1, the prism sheet 3' or 3" as illustrated in FIG. 13C can be obtained. In this case, a center-side located viewpoint $S_2$ coincides with the center position (Δ x=0) defined by the center PC of the prism sheet 3' or 3".

On the other hand, as illustrated in FIG. 13A or 13B, when the prism sheet 3' L or 3" L is cut at a cut position C2, the prism sheet 3' or 3" as illustrated in FIG. 13D can be obtained. In this case, an upper-side located viewpoint $S_1$ coincides with the center position (Δ x=0) defined by a position upward the center PC of the prism sheet 3' or 3'.

Thus, the position of the viewpoint and the center position (Δ x=0) can simply be changed by changing the cut position C1 or C2 of the large sized prism sheet 3' L or 3" L.

As explained above, the center position (Δ x=0) does not always coincide with the center position between the light incident surface $S_{in1}$ and the counter light incident surface $S_{in2}$ the center position (A x=0) can be near the light incident surface $S_{in1}$ or near the counter light incident surface $S_{in2}$ as illustrated in FIG. 13C.

Also, the triangular-shaped prisms 3' and 3" a do not always have a triangular shape; the triangular shape can be replaced by a peak shape having a curved apex.

Further, since the side-edge type surface light emitting apparatus can have a narrow distribution characteristic, the side-edge type surface light emitting apparatus according to the presently disclosed subject matter can be applied to an LCD unit exhibiting the privacy effect.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A side-edge type surface light emitting apparatus comprising:
    a single monolithic light guide plate having a light emitting surface and a light distribution controlling surface opposing each other, and a light incident surface and a counter light incident surface opposing each other on sides of said light emitting surface and said light distribution controlling surface;
    a light source disposed on said light incident surface; and
    a prism sheet having multiple peak-shaped prisms protruded toward said light emitting surface and in parallel with said light incident surface, said peak-shaped prisms being arranged in a vertical direction of said apparatus,
    each of said peak-shaped prisms having a definite apical shape and a definite apical height,
    said peak-shaped prisms having a definite pitch,
    said peak-shaped prisms having sloped angles gradually changed from said light incident surface to said counter light incident surface,
    said light incident surface of said light guide plate and said light source being on a down side or an up side of said side-edge type surface light emitting apparatus.

2. The side-edge type surface light emitting apparatus as set forth in claim 1, wherein the gradually-sloped angles of said peak-shaped prisms are changed linearly in accordance with a distance between each of said peak-shaped prisms and said light incident surface.

3. The side-edge type surface light emitting apparatus as set forth in claim 1, wherein each of said peak-shaped prisms has a light incident prism surface and a light reflecting prism surface sandwiching an apex thereof,
    the nearer to said light incident surface and the farther from a center location of said light guide plate, the light reflecting prism surfaces of said peak-shaped prisms gradually falling,
    the nearer to said counter light incident surface and the farther from the center location of said light guide plate, the light reflecting prism surfaces of said peak-shaped prisms gradually rising.

4. The side-edge type surface light-emitting apparatus as set forth in claim 3, wherein the center location of said prism sheet is equidistant from said light incident surface and said counter light incident surface.

5. The side-edge type surface light-emitting apparatus as set forth in claim 3, wherein the center location of said prism sheet is non-equidistant from said light incident surface and said counter light incident surface.

6. The side-edge type surface light emitting apparatus as set forth in claim 1, wherein the gradually sloped angles of said peak-shaped prisms are given by rotational angles of said peak-shaped prisms.

7. The side-edge type surface light emitting apparatus as set forth in claim 6, wherein the rotational angles of said peak-shaped prisms are given by $$\theta = a \cdot x + b$$

where x is a distance between each of said peak-shaped prisms and said light incident surface,
a is from −0.0285 to −0.0446, and
b is the rotational angle of one of said peak-shaped prisms on said light incident surface.

8. The side-edge type surface light emitting apparatus as set forth in claim 1, wherein each of said peak-shaped prisms has a light incident prism surface and a light reflecting prism surface sandwiching an apex thereof,
said prism sheet having a flat portion between the light reflecting prism surface of one of said peak-shaped prisms and the light incident prism surface of its adjacent one of said peak-shaped prisms.

9. The side-edge type surface light emitting apparatus as set forth in claim 1, wherein said peak-shaped prisms are concave against said light incident surface.

10. The side-edge type surface light emitting apparatus as set forth in claim 1, wherein each of said peak-shaped prisms comprises a triangular-shaped prism.

11. The side-edge type surface light emitting apparatus as set forth in claim 1, wherein said single monolithic light guide plate comprises:
multiple upper-side columnar structures provided on said light emitting surface perpendicular to said light incident surface;
multiple flat mirrors provided on said light distribution controlling surface in parallel with said light incident surface; and
multiple lower-side prisms provided on said light distribution controlling surface where said flat mirrors are not provided, said lower-side prisms protruded from said flat mirrors.

12. The side-edge type surface light emitting apparatus as set forth in claim 1, wherein said single monolithic light guide plate is configured to emit light directly to a user.

* * * * *